US012579425B2

(12) United States Patent
Lin et al.

(10) Patent No.: US 12,579,425 B2
(45) Date of Patent: Mar. 17, 2026

(54) PARAMETERIZED ACTIVATION FUNCTIONS TO ADJUST MODEL LINEARITY

(71) Applicant: QUALCOMM Incorporated, San Diego, CA (US)

(72) Inventors: Jamie Menjay Lin, San Diego, CA (US); Fatih Murat Porikli, San Diego, CA (US); Mustafa Keskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1011 days.

(21) Appl. No.: 17/407,085

(22) Filed: Aug. 19, 2021

(65) Prior Publication Data

US 2023/0057454 A1 Feb. 23, 2023

(51) Int. Cl.
*G06N 3/048* (2023.01)
*G06N 3/08* (2023.01)

(52) U.S. Cl.
CPC ............... *G06N 3/08* (2013.01); *G06N 3/048* (2023.01)

(58) Field of Classification Search
CPC ........... G06N 3/08; G06N 3/048; G06N 3/084
See application file for complete search history.

(56) References Cited

U.S. PATENT DOCUMENTS

| | | | |
|---|---|---|---|
| 10,867,247 B1 * | 12/2020 | Teig | G06N 3/084 |
| 11,953,457 B2 * | 4/2024 | Retzker | G06N 3/045 |
| 2015/0185717 A1 * | 7/2015 | Sayyar-Rodsari | G05B 17/02 |
| | | | 700/31 |
| 2022/0180177 A1 * | 6/2022 | Sawada | G06N 5/04 |
| 2022/0383573 A1 * | 12/2022 | Schroers | G06T 13/00 |

OTHER PUBLICATIONS

Apicella A., et al., "A Survey on Modern Trainable Activation Functions", Neural Networks, Elsevier Science Publishers, Barking, GB, vol. 138, Feb. 9, 2021, pp. 14-32, XP086538958, ISSN: 0893-6080, DOI: 10.1016/J.NEUNET.2021.01.026 [retrieved on Feb. 9, 2021] Section 4, figure 5.

Bingham G., et al., "Discovering Parametric Activation Functions", arxiv.org, Cornell University Library, 201 Olin Library Cornell University Ithaca, NY 14853, Jan. 30, 2021, 14 Pages, XP081870742, Last paragraph of Sections 3.1, figure 4.

International Search Report and Written Opinion—PCT/US2022/075154—ISA/EPO—Nov. 28, 2022.

* cited by examiner

*Primary Examiner* — KC Chen
(74) *Attorney, Agent, or Firm* — Patterson & Sheridan LLP

(57) ABSTRACT

Certain aspects of the present disclosure provide techniques for parameterized activation functions. Input data is processed with at least one layer of the neural network model comprising a parameterized activation function, and at least one trainable parameter of the parameterized activation function is updated based at least in part on output from the at least one layer of the neural network model. The at least one trainable parameter may adjust at least one of a range over which the parameterized activation function is nonlinear or a shape of the parameterized activation function, and/or may adjust a location of at least one pivot of the parameterized activation function.

29 Claims, 14 Drawing Sheets

400A 403    404

405     410     415

400B 415       425

700

705 — Select a network layer

710 — Select a channel

715 — Determine type of activation function

720 — Instantiate trainable parameter(s) for activation function based on determined type 725 — Additional channel(s)?

Yes

No

730 — Additional layer(s)?

Yes

No

735 — Adjust linearity of network layers by training activation function parameter(s)

900

1000

1005

Process input data with at least one layer of the neural network model comprising a parameterized activation function

1010

Update at least one trainable parameter of the parameterized activation function based at least in part on output from the at least one layer of the neural network model

1100

Receive input data at a first neuron of the neural network model, wherein the first neuron is associated with a parameterized activation function defined based on a trainable parameter

1105

Process the input data using the parameterized activation function to generate an output activation

1110

Generate an inference based at least in part on the output activation

1115

1200

| | |
|---|---|
| CPU — 1202 | NPU — 1208 |
| GPU — 1204 | Input/Output — 1210 |
| DSP — 1206 | |

MEMORY — 1214

Training Component — 1220

Model Parameters — 1230

Inferencing Component — 1222

PARAMETERIZED ACTIVATION FUNCTIONS TO ADJUST MODEL LINEARITY

INTRODUCTION

Aspects of the present disclosure relate to machine learning.

Activation functions are nearly ubiquitous in modern machine learning. Generally, an activation function is used to generate an output activation given some pre-activation input data. For example, in a neural network, each neuron may be associated with an activation function that is used to generate the output of the neuron based on the neuron's inputs.

In existing machine learning model architectures, the architect must select, for each layer or segment of the model, an appropriate activation function. This may include determining whether to use a linear or nonlinear activation function for each segment. However, making such a decision ab initio without complete understanding of the domain (e.g., without understanding the distribution of input and output data) may lead to sub-optimal model performance. Further, once the activation function(s) are selected and training begins, they cannot be changed without restarting the training process.

In an effort to improve the expressive power of activations and improve the resulting models, a variety of different activation functions have been designed. For example, the simple rectified linear activation unit (ReLU) is widely used, as well as more recent and complex functions like swish and h-swish. However, despite a wider variety of activation functions to choose from, the technical problem remains that choosing the best activation function for a particular model architecture and type of data amounts to guess-and-check, which is time-consuming and computationally expensive.

Accordingly, improved activation functions for machine learning models are needed.

BRIEF SUMMARY

Certain aspects provide a method, comprising: processing input data with at least one layer of the neural network model comprising a parameterized activation function; and updating at least one trainable parameter of the parameterized activation function based at least in part on output from the at least one layer of the neural network model, wherein the at least one trainable parameter adjusts at least one of a range over which the parameterized activation function is nonlinear or a shape of the parameterized activation function.

Further aspects provide a method, comprising: processing input data with at least one layer of the neural network model comprising a parameterized activation function; and updating at least one trainable parameter of the parameterized activation function based at least in part on output from the at least one layer of the neural network model, wherein the at least one trainable parameter adjusts a location of at least one pivot of the parameterized activation function.

Further aspects provide a method, comprising: processing input data with at least one layer of the neural network model comprising a parameterized activation function; and updating at least one trainable parameter of the parameterized activation function based at least in part on output from the at least one layer of the neural network model.

Further aspects provide a method, comprising: receiving input data at a first neuron of the neural network model, wherein the first neuron is associated with a parameterized activation function defined based on a trainable parameter that adjusts a range over which the parametrized activation function is nonlinear; processing the input data using the parameterized activation function to generate an output activation; and generating an inference based at least in part on the output activation.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
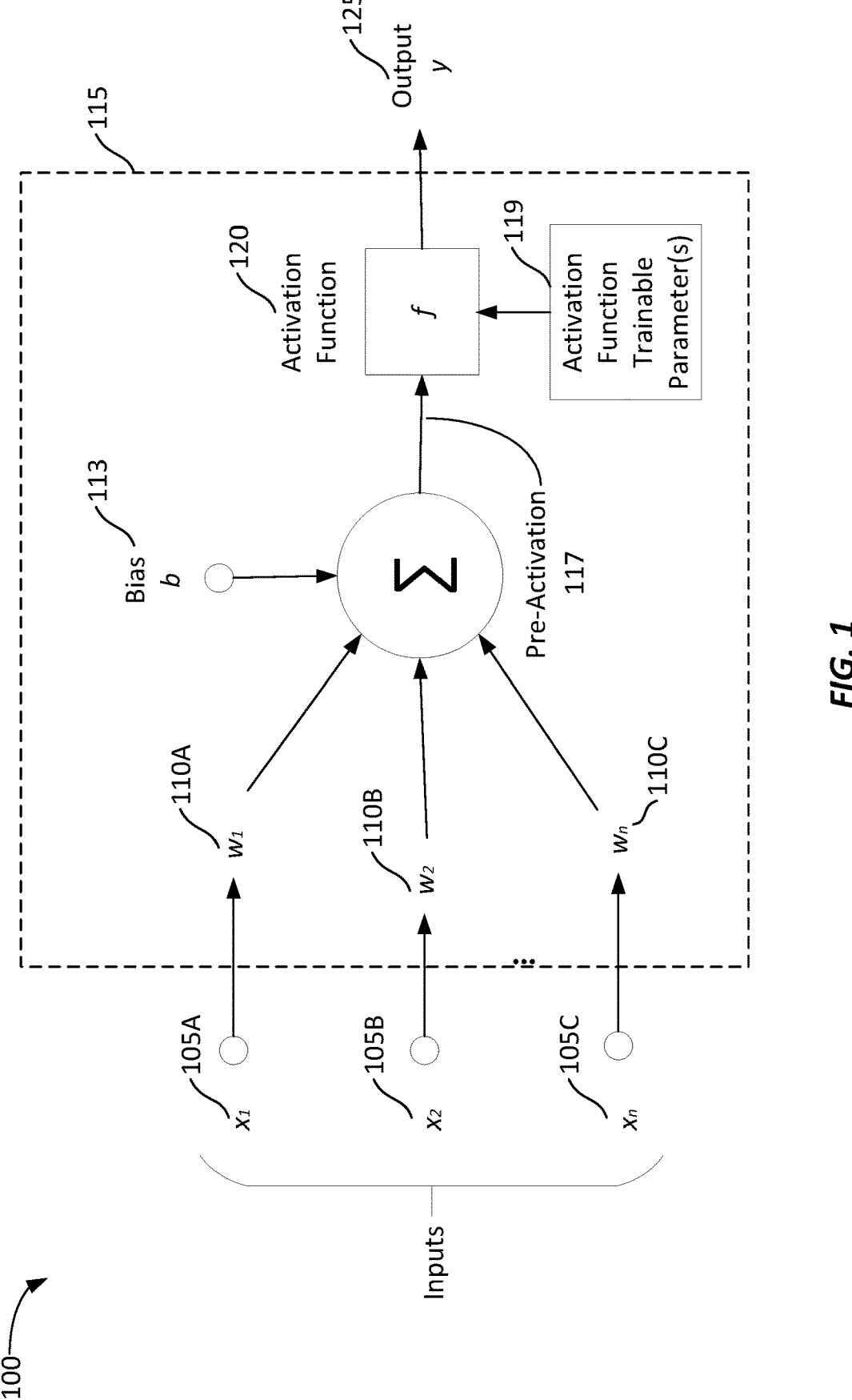
FIG. 1 depicts an example model architecture using a parameterized activation function.

Aspects of the present disclosure provide techniques for training and using parameterized activation functions for machine learning models.

While some examples discussed in the present disclosure relate to neural networks, the aspects described can be applied to a wide variety of machine learning architectures. In neural network design, various heuristics have been applied to decide, for each layer, whether a linear or non-linear activation function should be used. This decision is generally untethered from the characteristics of the underlying data and is static once training begins.

Existing attempts to provide deeper expressivity and flexibility to activation functions have generally introduced significant computational overhead. For example, ReLU has become an extremely popular activation function for non-linearity, but it has limited expressive power and is rigid in its applicability. Other functions, such as swish and h-swish, have additional expressive power, but they still require a linear/nonlinear decision to be made before training begins, and additionally impose significant computational overhead, such as through runtime multiplications of pre-activation data or use of look-up tables, which requires increased memory access. Similarly, the leaky ReLU (LReLU) and parametric ReLU (PReLU) functions require additional multiplication of pre-activation data, which is computationally costly.

Perhaps the most significant limitation of conventional approaches is that they are static and fail to account for differing characteristics and distributions of the pre-activation data. Some efforts to cope with different characteristics of the pre-activation distribution have included application of various normalization techniques to alter the parameters of the probability distribution function (PDF) of the pre-activations. For example, given a Gaussian distribution assumption, one may re-parametrize the pre-activations by changing the mean and variance of the PDF.

Existing activation functions, however, do not cope well with this sort of normalization or re-parametrization of pre-activations due at least in part to the lack of a suitable mechanism to reflect such normalization or re-parametrization. That is, conventional activation functions (such as ReLU or Leaky/Parametric ReLU) have (immovable) pivots fixed at zero, which implies significant assumptions about the underlying data. Because batch normalization can move the mean of an activation distribution, having a fixed pivot can introduce substantial side effects around these fixed locations. Aspects of the present disclosure, however, can adjust these pivots through optimal learning, thereby supporting such (location-based) re-parametrization.

Aspects of the present disclosure provide various techniques to parameterize activation functions that allows for them to be dynamically adapted during training in order to provide improved output activations based on the characteristics of the pre-activation data. Generally, the parameterized activation functions described herein enable use of one or more trainable parameters that adjust the linearity or nonlinearity of the activation function. The parameterized activation functions described herein are generally nonlinear functions (some of which are piecewise linear with one or more linear regions). As used herein, regions or ranges of a function can be described as "linear" or "nonlinear" with respect to the input data (e.g., the pre-activation data).

Generally, ranges where the output of the activation function linearly changes with the input pre-activation may be referred to as linear ranges of the function. For example, linear regions of the activation function may correspond to ranges where the output conforms to y=ax+b, where y is the output value, x is the input value, and a and b are predefined or trainable values corresponding to the slope and intercept of the linear region. Ranges where the output of the activation function does not linearly change with the input pre-activations. For example, a nonlinear region of the activation function may correspond to a range where the output remains constant (e.g., y=b, where b is a fixed value), or changes in a non-linear manner (e.g., a curve) may be referred to as nonlinear ranges of the function.

In some aspects, trainable parameters may be used to adjust the range(s) of input values over which the activation function is linear or non-linear. Further, in some aspects, a trainable parameter may be used to modify the location of one or more pivots of the activation function, thereby affecting linearity and nonlinearity in response to the unique distribution of pre-activation data.

Accordingly, aspects described herein overcome conventional limitations with activation functions and improve the performance of machine learning models.

Example Model Architecture

FIG. 1 depicts an example model architecture 100 using a parameterized activation function. Specifically, the architecture 100 depicts a neuron (or node) 115 in an artificial neural network.

In the illustrated architecture, the neuron 115 receives inputs 105A-C. Generally, the input 105 is a tensor or data value provided to neuron from an input layer or previous layer of a neural network model.

Although the illustrated example depicts three inputs 105A-C, in aspects, there may be any number of inputs to a given neuron 115 (e.g., n inputs). Further, although each input 105 in the illustrated architecture 100 is provided to a single neuron 115, in aspects, a given data element may be provided as input to any number of neurons. That is, a neuron in a first layer may output a data value (e.g., input 105A) to two or more neurons in a subsequent layer.

In the depicted architecture 100, each input 105A-C is applied to a respective weight 110A-C (collectively weights 110). Weights 110 are learned during a training process for the network, as discussed below in more detail.

The neuron 115 generally receives the weighted inputs and computes pre-activation data based on the sum of all the weighted inputs. Further, in various examples, neuron 115 may also sum a bias parameter 113 as part of generating the pre-activation data. The particular technique used to compute the pre-activation data may vary depending on the particular architecture. In some aspects, the neuron 115 computes the weighted average or weighted sum of its inputs 105. That is, each input 105A-C may be multiplied by the weight of the associated connection 110A-C, and the resulting weighted inputs may summed and/or averaged by the neuron 115 to generate pre-activation data 117.

In the illustrated architecture 100, this pre-activation data 117 is processed using an activation function 120 in order to generate the output 125 from the neuron 115. Generally, this output 125 is data value that is provided to a subsequent layer of the network (or as final output from the network). That is, the output 125 may be provided as input data to one or more neurons in a downstream layer. In some aspects, the output 125 is a scalar value that, along with output from a plurality of other neurons, can be included in an array or tensor for a downstream layer.

Existing systems often use activation functions such as ReLU to introduce non-linearity to the model. ReLU may be realized using max(0, z), where z is the pre-activation data. That is, if the pre-activation is lower than zero, the resulting output (using a ReLU activation function) is zero. If the pre-activation is greater than zero, then the resulting output is the pre-activation value.

As discussed above, ReLU (and other existing activation functions) are limited in their expressive power, as well as fixed in their linearity or non-linearity. This rigidity may cause the model to fail to perform optimally, resulting in reduced model accuracy.

In aspects of the present disclosure, therefore, the activation function 120 is parameterized and defined in part by a trainable parameter that can be learned and refined during training. This can significantly improve the expressivity of the function, as well as increasing model flexibility. By using such parametrized activation functions, the model performance may be increased, as compared to conventional non-parameterized activation functions and thus represents a technical solution to a technical problem associated with the conventional activation functions. Further, the particular parameterized activation functions described herein do not require additional multiplication operations on the pre-activation data (unlike functions like swish), and thus do not significantly affect computational requirements of the model (in terms of number of operations, processing time, and the like). Notably, introducing one or more trainable parameter for one or more activation function in a model architecture (and, in some aspects, for each input channel) has a minimal impact on model size while providing a significant model accuracy improvement.

In some aspects, the activation function 120 is defined using a trainable parameter that affects the range(s) of input values where the model is linear and nonlinear. For example, while ReLU is linear for all values greater than zero and non-linear for all other values, the linear range(s) of the parametrized activation function 120 may vary as the trainable parameter is refined during training. Example parametrized activation functions that adaptively change their linear ranges are described in more detail below, with reference to FIG. 2.

Generally, such parametrized activation functions 120 can be conceptualized as a superset of both linear and nonlinear functions. That is, the parameterized activation function may be purely linear or purely non-linear (or any amount of linearity in between these extremes), depending on the particular value of the learned trainable parameter.

Advantageously, when using such parameterized activation functions in a neural network, there is no need to make heuristic pre-determinations (before training) regarding whether a given layer should be activated using a linear or nonlinear function. Instead, the model can learn automatically through optimization techniques, such as gradient descent, and configure itself to obtain the optimal level of linearity for the particular model architecture and input data characteristics. Further, due to adaptive nature of the parameterized activation function, the parameterized activation function may be applied arbitrarily in any layers, as it will adapt to reflect the appropriate level of linearity for the layer.

In some aspects, in addition to or instead of using a parameterized activation function that adjust the range of linearity, the architecture 100 may use a parameterized activation function 120 that is defined based in part on trainable parameter(s) that can move or shift the location of one or more pivots in the activation function.

In some aspects, a pivot of an activation function is a point of inflection in the function where the activation function changes concavity and/or convexity (e.g., where the curvature changes sign in a smooth function). In some aspects, pivots are stationary points in the function, where the derivative of the graph is zero (e.g., local maxima and minima). In some aspects, pivots are non-differentiable point in the function (e.g., a non-smooth bend in the function). These pivots are often useful in characterizing or describing the activation function. For example, the ReLU function has a pivot at x=0.

In some aspects, the pivot(s) of the parameterized activation function is defined using a trainable parameter that is learned based at least in part on moments of the distribution of the pre-activation data (e.g., in order to reflect the physical characteristics and structure of the random process resulting in the pre-activations). That is, if the pre-activation data values for a given batch can be described using a Gaussian distribution with mean $\mu$ and variance a, the trainable parameter may be learned based on these distribution values (mean and variance), such that the pivot(s) of the pre-activation function are shifted to account for the distribution. Thus, while existing systems assume a zero-centered pre-activation distribution, the parameterized activation function can be optimized through learning for different distributions of training data. Parameterized activation functions that adaptively adjust pivot locations are discussed in more detail below with reference to FIG. 5.

In aspects of the present disclosure, the trainable parameter(s) 119 of the activation function(s) 120 are refined alongside the weights 110 (and any other parameters) during this training process. Thus, beneficially, no separate training process is necessary to adapt the trainable activation functions.

For example, the weights 110 may be initialized (e.g., with random values) and then iteratively refined during training (e.g., using stochastic gradient descent or batch gradient descent). Similarly, the trainable parameters 119 may be initialized and subsequently refined during the same training (e.g., using stochastic gradient descent or batch gradient descent).

To refine the model parameters (the weights 110 and the trainable parameters 119 of the activation function(s)), input data is processed by the model to generate an output. This output may then be compared to a ground truth label for the input data in order to generate a loss. The loss can then be used to compute gradients (e.g., via back propagation) in order to update each weight 110 as well as the trainable parameter(s) 119 of parameterized activation function 120. This causes the activation functions 120 to be refined and adapted for the particular input data and position in the model, resulting in improved model accuracy.

Example Parameterized Activation Functions Using Multiple Pivots

Figure 2:
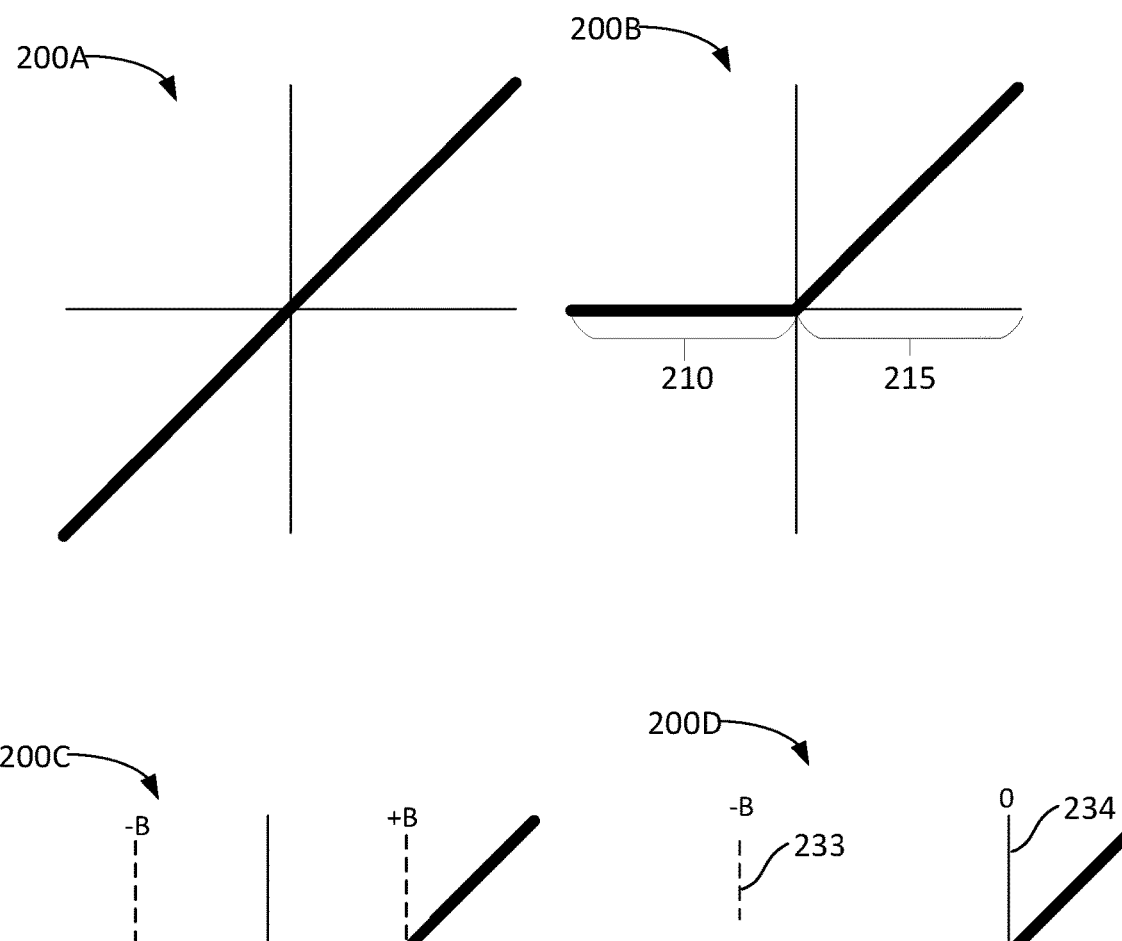
FIGS. 2, 3A, 3B, 4A, and 4B depict example linear, nonlinear, and parameterized activation functions using pivots.

FIG. 2 depicts example linear, nonlinear, and parameterized activation functions using one or more pivots. Specifically, the activation function 200A is a linear activation function, activation function 200B is a nonlinear activation function (e.g., ReLU) with a single pivot, activation function 200C is a symmetric parameterized activation function with two pivots, and activation function 200D is an asymmetric parameterized activation function with two pivots. In some aspects, the parameterized activation functions 200C and 200D may be referred to as "N-oid" activation functions.

Each activation function 200 is depicted on a two-dimensional coordinate plane, where the value on the horizontal axis (also referred to as the x-axis) corresponds to the pre-activation data value and the value on the vertical axis (also referred to as the y-axis) corresponds to the resulting output of the activation function. For example, referring to activation function 200A, the activation function is a linear function y=x. Thus, the output activation value y is equivalent to the pre-activation value x.

Activation function 200B depicts the ReLU function. As illustrated, the ReLU function has two distinct ranges: the range 210 where the output is fixed (e.g., a fixed value of zero), and the range 215 where the output linearly changes (e.g., where y=x). As illustrated, the pivot between the range 210 and the range 215 is located at x=0. Thus, the activation function 200B can be defined as a(x)=max(0, x). Alternatively, the activation function 200B may be defined using Equation 1 below.

$$a(x) = \begin{cases} 0, x < 0 \\ x, x \geq 0 \end{cases} \tag{1}$$

Notably, the activation functions 200A and 200B are fixed. That is, the shape of each does not change during training. This fixed nature severely limits their flexibility, and reduces their expressive power.

In aspects of the present disclosure, parameterized activation functions are provided, where one or more parameters defining the activation function(s) are learned during training. These trainable parameters can generally define the shape of the activation function(s), such as by moving pivot points, changing bend weights, and the like.

Activation function 200C depicts a symmetric parameterized activation function, according to some aspects described herein. As illustrated, the parameterized activation function 200C includes a first range 220 that is linear, a second range 225 that is nonlinear, and a third range 230 that is linear. The pivots of the parameterized activation function 200C are located at x=+/−B (as indicated by lines 218 and 219), where B is a trainable parameter with a value greater than or equal to zero that is learned during training. In some aspects, the activation function 200C is referred to as symmetric because the pivots are equidistant from x=0. B is an example of a trainable parameter 119 in FIG. 1. Thus, the nonlinear (constant) range 225 spans values of x between −B and +B as indicated by dashed lines 218 and 219. In one aspect, the parameterized activation function 200C is defined using Equation 2, below.

$$\alpha(x) = \begin{cases} x - B, x \geq B \geq 0 \\ 0, -B \leq x < B \\ x + B, x < -B \leq 0 \end{cases} \tag{2}$$

In some aspects, the parameterized activation function 200C can be defined or performed by applying two ReLU functions, or two max(•) functions. Thus, the parameterized activation function 200C can beneficially be realized with existing hardware (e.g., machine learning accelerators) that have been developed to implement ReLU. In one such aspect, the parameterized activation function 200C can be defined using Equation 3 below, where ρ(•) is the ReLU function (or a max(•) function).

$$\alpha(x) = \rho(x - B) - \rho(-x - B) \tag{3}$$

Activation function 200D depicts an asymmetric parameterized activation function. As illustrated, the parameterized activation function 200D includes a first range 235 that is linear, a second range 240 that is nonlinear, and a third range 245 that is linear. The pivots of the parameterized activation function 200D are located at x=−B and x=0 (as indicated by lines 233 and 234) and is thus asymmetric about the vertical axis. As above, B is a trainable parameter with a value greater than or equal to zero that is learned during training. Thus, the nonlinear range 240 spans values of x between −B and 0, indicated by dashed line 233 and the vertical axis of the graph. In some aspects, the activation function 200D is referred to as asymmetric because the pivots are not equidistant from x=0. In one aspect, the parameterized activation function 200D is defined using Equation 4, below.

$$\alpha(x) = \begin{cases} x, x \geq 0 \\ 0, -B \leq x < 0 \\ x + B, x < -B \leq 0 \end{cases} \tag{4}$$

In some aspects, similar to the parameterized activation function 200C, the parameterized activation function 200D can also be defined or performed by applying two ReLU functions, or two max(•) functions. Thus, the parameterized activation function 200D can also be realized with hardware that has been developed to implement ReLU. In one such aspect, the parameterized activation function 200D can be defined using Equation 5 below, where ρ(•) is the ReLU function (or a max(•) function).

$$\alpha(x) = \rho(x) - \rho(-x - \beta) \tag{5}$$

In some aspects, if the parameterized activation function 200C immediately follows a batch normalization operation, then the symmetric parameterized activation function 200C and asymmetric parameterized activation function 200D may be relatively interchangeable, as the batch normalization may learn to shift the activations with a bias that causes the output to be equivalent (or nearly equivalent) for either parameterized activation function 200C or 200D.

Generally, the trainable parameter B in the parameterized activation functions 200C and 200D is trained alongside other trainable model parameters (e.g., weights and biases) based on training data using existing training techniques. In some aspects, the trainable parameter B may be referred to as an activation bias parameter.

In some aspects, the system can train and use a separate trainable parameter B for each channel within each layer where the parameterized activation function is applied. That is, if the layer receives multi-channel input data, the system may train a respective trainable parameter $B_i$ for each respective channel $C_i$ in the layer. This can allow the system to adapt to the characteristics of the input data specific to each individual channel, enhancing model accuracy.

Advantageously, the parameterized activation functions 200C and 200D have higher expressivity than existing activation functions, which results in higher model accuracy, better inferences, and the like. Specifically, the parameterized activation functions 200C and 200D turn the input pre-activation x into a powerful ternary activation output (that is, an activation output with three distinct regions or parts), which not only honors the positive elements (included in the ranges 230 or 245), but also rejects intermediate elements (in the ranges 225 and 240) while further allowing strong negative elements (in the ranges 220 and 235).

Additionally, in some aspects, the parameterized activation functions 200C and 200D may be become purely linear functions through training (e.g., when B reaches or approaches zero), or purely ReLU functions (e.g., when B is sufficiently larger than the pre-activation values, or approaches infinity). Thus, a single parameterized activation function is beneficially able to assume a linear or non-linear configuration based on training.

Moreover, the parameterized activation functions 200C and 200D are very lightweight in their computational complexity. Each requires no multiplications of pre-activation data (unlike existing functions such as LReLU, PReLU, and h-swish). Instead, the parameterized activation functions 200C and 200D require only a sign check and a bias summation. Additionally, the parameterized activation functions 200C and 200D introduce relatively few additional parameters over existing systems. For example, applying the parameterized activation functions 200C and/or 200D to the MobileNetV2 architecture results in a 0.03% model size increase with significantly higher increases in accuracy.

Figure 3A:
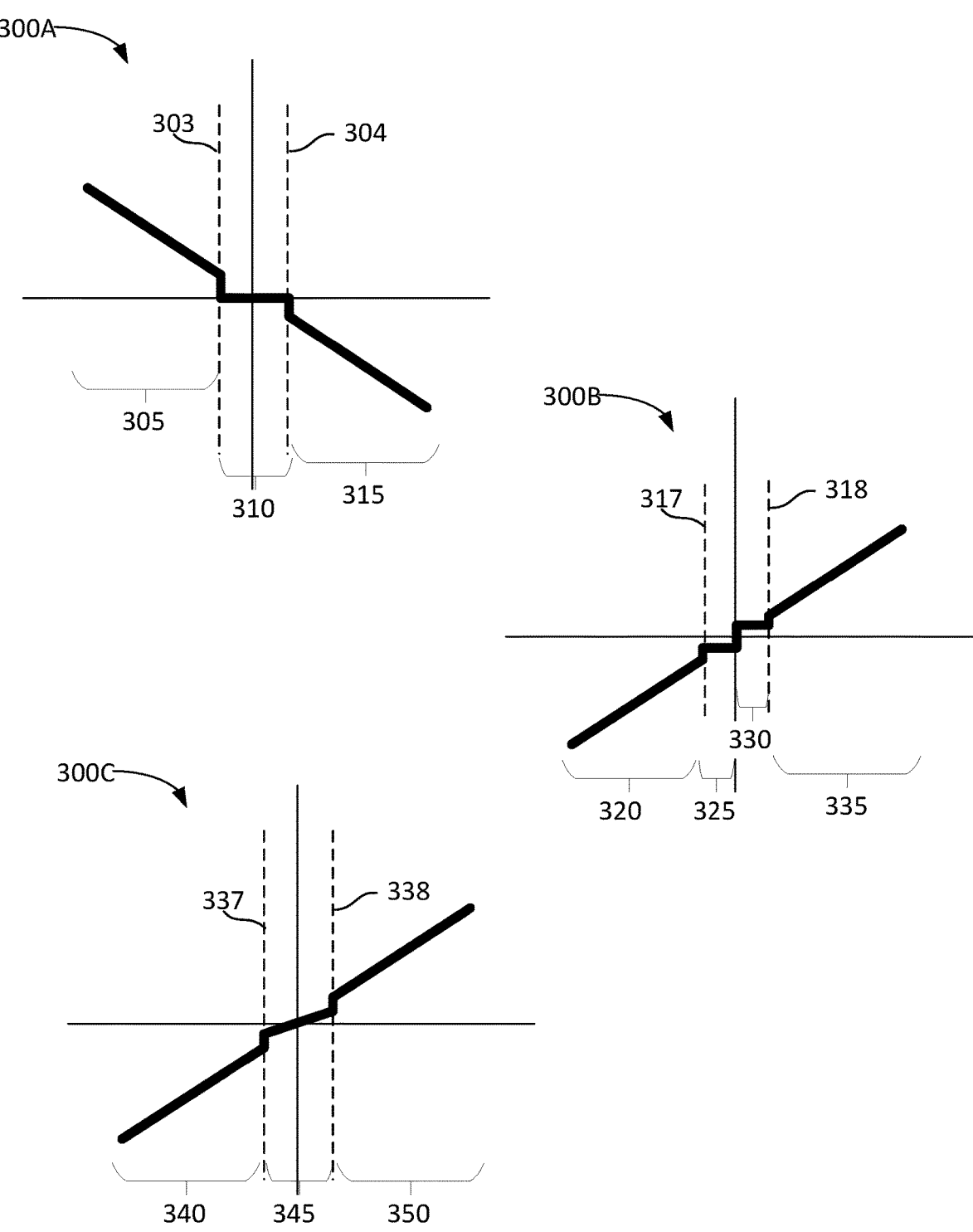
Figure 3B:
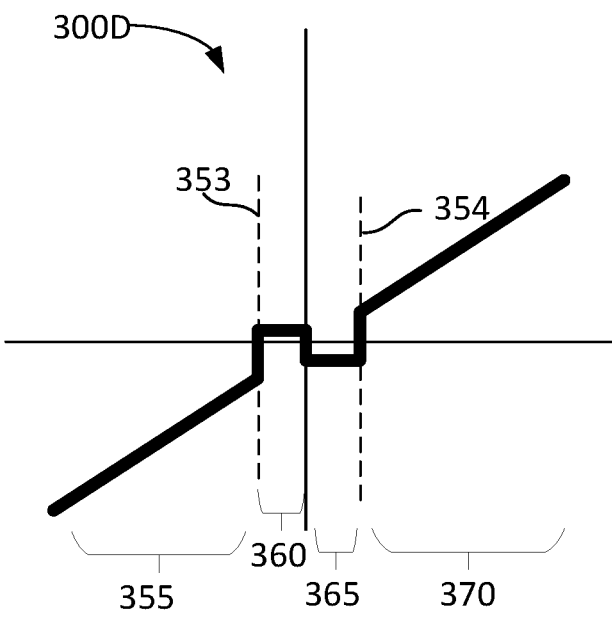
Figure 3B:
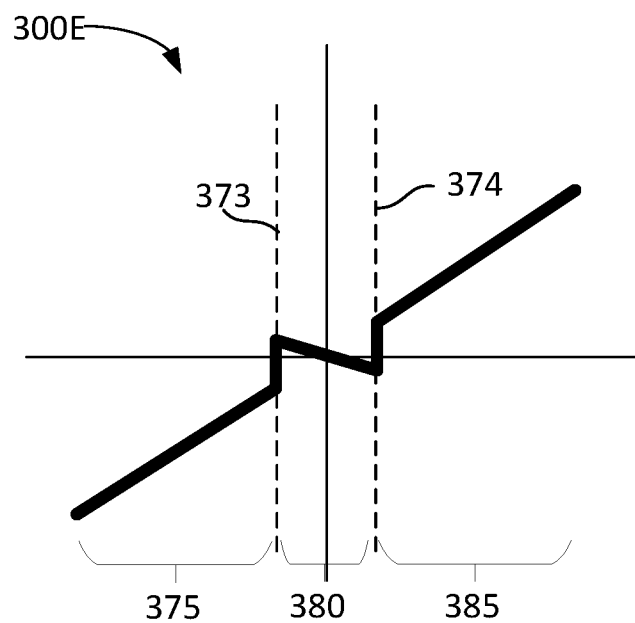

FIGS. 3A and 3B depict additional example parameterized activation functions.

Illustrated in FIG. 3A, parameterized activation function 300A depicts what may be referred to as an inverse parameterized activation function in some aspects described herein. The inverse parameterized activation function 300A is defined based on a trainable parameter B. In the illustrated aspect, the parameterized activation function 300A can be defined using Equation 6, below.

$$\alpha(x) = \begin{cases} -x + B, & x \geq B \\ 0, & -B \leq x < 0 \\ -x - B, & x < -B \end{cases} \tag{6}$$

As illustrated, the parameterized activation function 300A includes a first range 305 for input values less than −B (indicated by line 303), a second (constant) range 310 at y=0 for inputs greater than or equal to −B (indicated by line 303) and less than B (indicated by line 304), and a third range 315 for inputs greater than or equal to B (indicated by line 304).

Illustrated in FIG. 3A, parameterized activation function 300B depicts what may be referred to as a step activation function in some aspects described herein. The step parameterized activation function 300B is defined based on two trainable parameters B and C. In the illustrated aspect, the parameterized activation function 300B can be defined using Equation 7, below.

$$\alpha(x) = \begin{cases} x - B, & x \geq B \\ C, & 0 \leq x < B \\ -C, & -B \leq x < 0 \\ x + B, & x < -B \end{cases} \tag{7}$$

As illustrated, the parameterized activation function 300B includes a first range 320 for input values less than −B (indicated by line 317), a second (constant) range 325 at y=−C for inputs greater than or equal to −B (indicated by line 317) and less than 0, a third range 330 for inputs greater than or equal to 0 and less than B (indicated by line 318), and a fourth range 335 for inputs greater than or equal to B.

Illustrated in FIG. 3A, parameterized activation function 300C depicts what may be referred to as a transitional slope activation function in some aspects described herein. The transitional slope parameterized activation function 300C is defined based on a trainable parameter B and a scale factor p, which may be a hyperparameter or a trainable parameter. In the illustrated aspect, the parameterized activation function 300C can be defined using Equation 8, below.

$$\alpha(x) = \begin{cases} x - B, & x \geq B \\ px, & -B \leq x < B \\ x + B, & x < -B \end{cases} \tag{8}$$

As illustrated, the parameterized activation function 300C includes a first range 340 for input values less than −B (indicated by line 337), a second range 345 for inputs greater than or equal to −B (indicated by line 337) and less than B (indicated by line 338), and a third range 350 for inputs greater than or equal to B (indicated by line 338).

Illustrated in FIG. 3B, parameterized activation function 300D depicts what may be referred to as an inverse step parameterized activation function in some aspects described herein. The inverse step parameterized activation function 300D is defined based on a trainable parameters B and C. In the illustrated aspect, the parameterized activation function 300D can be defined using Equation 9, below $$\alpha(x) = \begin{cases} x - B, & x \geq B \\ -C, & 0 \leq x < B \\ C, & -B \leq x < 0 \\ x + B, & x < -B \end{cases} \tag{9}$$

As illustrated, the parameterized activation function 300D includes a first range 355 for input values less than −B (indicated by line 353), a second (constant) range 360 at y=C for inputs greater than or equal to −B (indicated by line 353) and less than 0, a third (constant) range 365 at y=−C for inputs greater than or equal to 0 and less than B (indicated by line 354), and a fourth range 370 for inputs greater than or equal to B.

Illustrated in FIG. 3B, parameterized activation function 300E depicts what may be referred to as an inverse transitional slope activation function in some aspects described herein. The inverse transitional slope parameterized activation function 300E is defined based on a trainable parameter B and a scale factor p, which may be a hyperparameter or a trainable parameter. In the illustrated aspect, the parameterized activation function 300E can be defined using Equation 10, below.

$$\alpha(x) = \begin{cases} x - B, & x \geq B \\ -px, & -B \leq x < B \\ x + B, & x < -B \end{cases} \tag{10}$$

As illustrated, the parameterized activation function 300E includes a first range 375 for input values less than −B (indicated by line 373), a second range 380 for inputs greater than or equal to −B (indicated by line 373) and less than B (indicated by line 374), and a third range 385 for inputs greater than or equal to B (indicated by line 374).

Figure 4A:
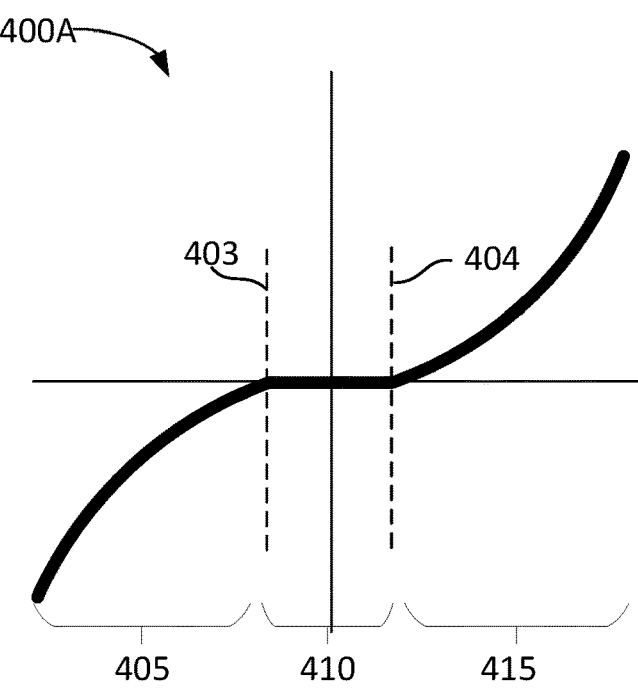
Figure 4A:
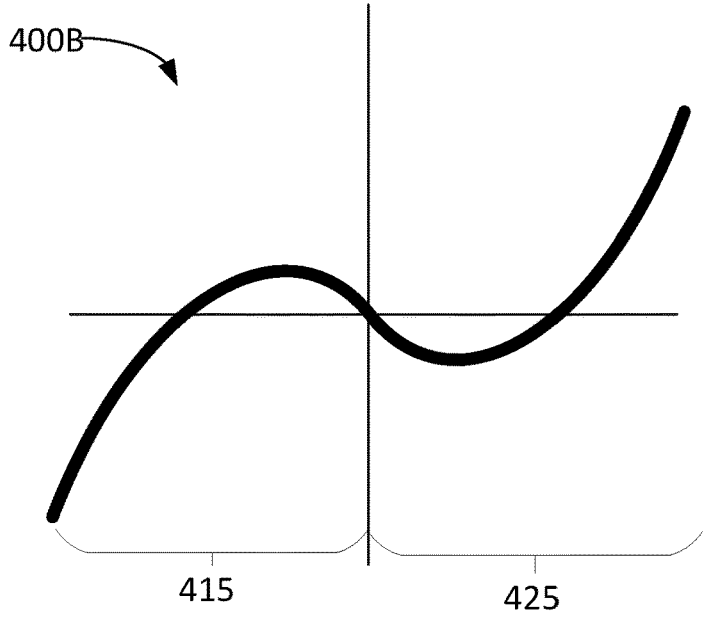
Figure 4B:
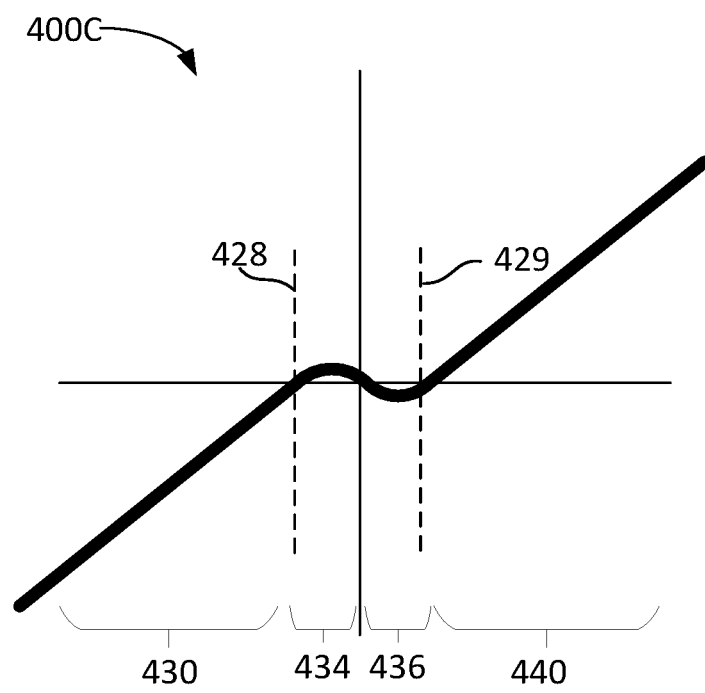
Figure 4B:
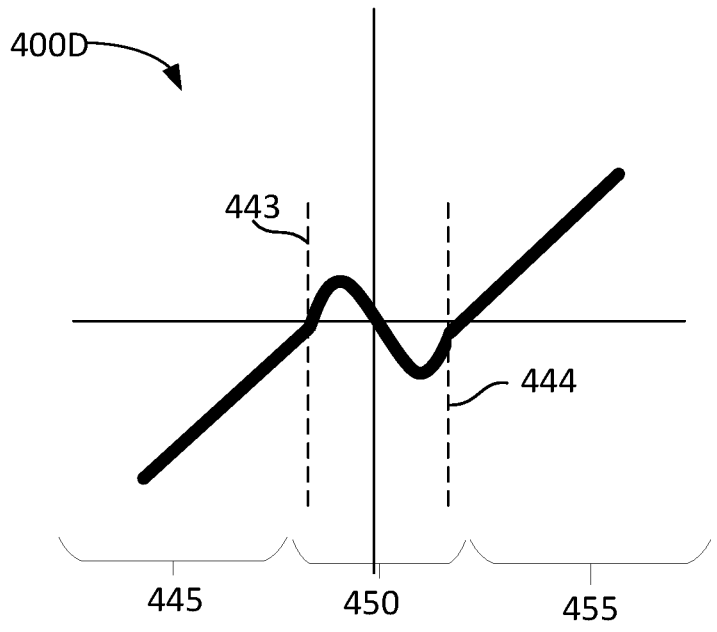

FIGS. 4A and 4B depict additional example parameterized activation functions. Specifically, the examples depicted in FIGS. 4A and 4B are smooth parameterized activation functions.

Illustrated in FIG. 4A, Parameterized activation function 400A depicts what may be referred to as a monotonic Knoll (MK) N-oid activation function in some aspects described herein. In some aspects, the MK N-oid parameterized activation function 400A is an N-oid activation function with some amount of smoothing applied. In aspects, the bend weight of the pivot(s) may be defined using a defined hyperparameter or a trainable parameter.

The MK N-oid parameterized activation function 400A is defined based on trainable parameter B. In the illustrated aspect, the parameterized activation function 400A can be defined using Equation 11, below.

$$\alpha(x) = \begin{cases} x*(\dfrac{x}{sqrt(B)} - sqrt(B)), \ x \geq B \\ 0, \ -B \leq x < B \\ -x*(\dfrac{x}{sqrt(B)} + sqrt(B)), \ x < -B \end{cases} \tag{11}$$

As illustrated, the parameterized activation function 400A includes a first range 405 for input values less than −B (indicated by line 403), a second (constant) range 410 at y=0 for inputs greater than or equal to −B (indicated by line 403) and less than B (indicated by line 404), and a third range 415 for inputs greater than or equal to B (depicted by line 404).

Also illustrated in FIG. 4A, parameterized activation function 400B depicts what may be referred to as a non-monotonic Knoll (NK) N-oid activation function in some aspects described herein. In some aspects, the NK N-oid parameterized activation function 400B is an N-oid activation function with some amount of smoothing applied. In aspects, the bend weight of the pivot(s) may be defined using a defined hyperparameter or a trainable parameter.

The NK N-oid parameterized activation function 400B is defined based on trainable parameter B. In the illustrated aspect, the parameterized activation function 400B can be defined using Equation 12, below.

$$\alpha(x) = \begin{cases} -x*(sqrt(B) - \dfrac{x}{sqrt(B)}), \ x \geq 0 \\ -x*(sqrt(B) + \dfrac{x}{sqrt(B)}), \ x < 0 \end{cases} \tag{12}$$

As illustrated, the parameterized activation function 400B includes a first range 415 for input values less than or equal to 0, and a second range 425 for inputs greater than 0. In some aspects, the NK N-oid and MK N-oid functions can both be accomplished using a single equation with trainable pivots.

Illustrated in FIG. 4B, Parameterized activation function 400C depicts what may be referred to as an NK N-oid activation function with linear portions after pivot points in some aspects described herein.

The parameterized activation function 400C is defined based on trainable parameter B. In the illustrated aspect, the parameterized activation function 400A can be defined using Equation 13, below.

$$\alpha(x) = \begin{cases} x - B, \ x \geq B \\ -x*(sqrt(B) - \dfrac{x}{sqrt(B)}), \ 0 \leq x < B \\ -x*(sqrt(B) + \dfrac{x}{sqrt(B)}), \ -B \leq x < 0 \\ x + B, \ x < -B \end{cases} \tag{13}$$

As illustrated, the parameterized activation function 400C includes a first range 430 for input values less than −B (indicated by line 428), a second range 434 for inputs greater than or equal to −B (indicated by line 428) and less than 0, a third range 436 for inputs greater than or equal to 0 and less than B (indicated by line 429), and a fourth range 440 for inputs greater than or equal to B.

Also illustrated in FIG. 4B, parameterized activation function 400D depicts what may be referred to as an NK N-oid variant activation function in some aspects described herein.

The parameterized activation function 400D is defined based on trainable parameter B. In the illustrated aspect, the parameterized activation function 400D can be defined using Equation 14, below.

$$\alpha(x) = \begin{cases} x - B, \ x \geq B \\ -1*(\sin(\pi*\dfrac{x}{B})), \ -B \leq x < B \\ x + B, \ x < -B \end{cases} \tag{14}$$

As illustrated, the parameterized activation function 400D includes a first range 445 for input values less than −B (indicated by line 443), a second range 450 for inputs greater than or equal to −B (indicated by line 443) and less than B (indicated by line 444), and a third range 455 for inputs greater than or equal to B (indicated by line 455).

Example Parameterized Activation Functions Using Shifted Pivots

Figure 5:
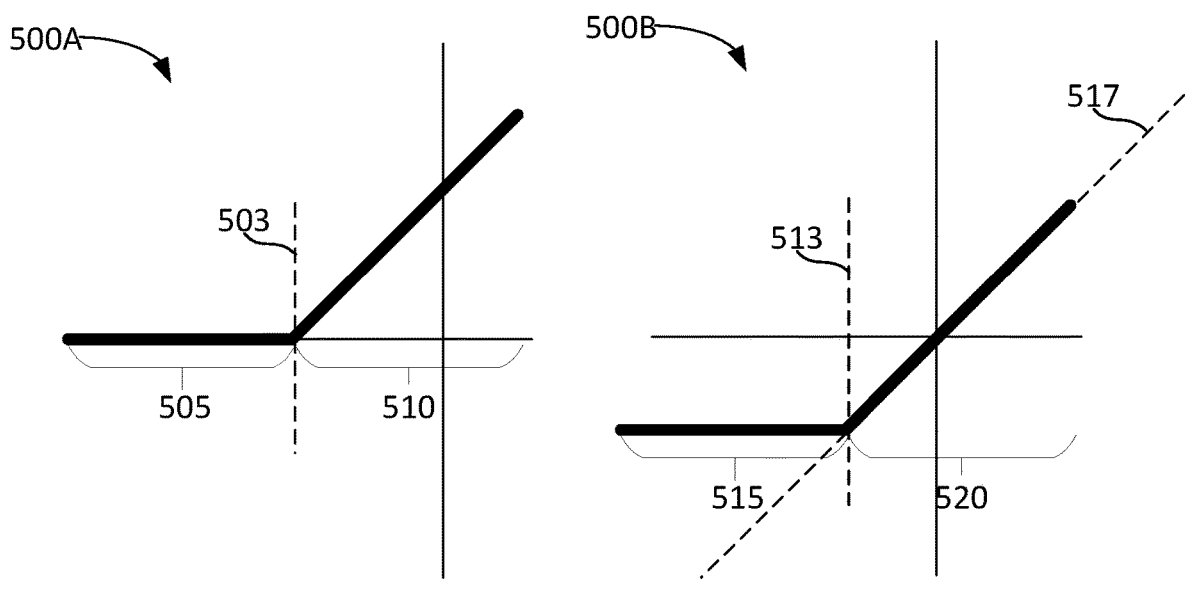
FIG. 5 depicts example parameterized activation functions using shifted pivots.
Figure 5:
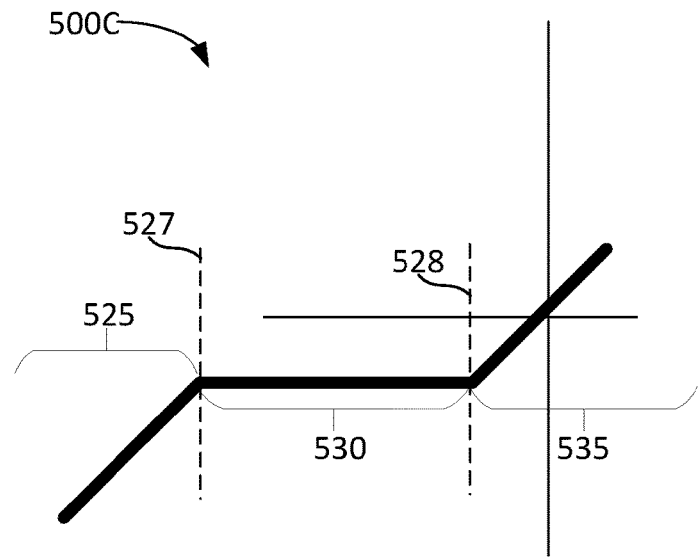

FIG. 5 depicts example parameterized activation functions using shifted pivots. Specifically, the parameterized activation function 500A is shifted along the horizontal axis (referred to in some aspects as activation normalization), while the parameterized activation functions 500B and 500C are shifted along a diagonal line (referred to in some aspects as diagonalization).

As used herein, a pivot p of a nonlinear activation function for a given channel is defined as a point, x=p. For example, as discussed above, a ReLU nonlinear function has a pivot at x=0.

In some aspects, given any definition of a nonlinear activation function with one or multiple pivots m, all the pivot(s) may be defined as a function of moments of the pre-activation data x (as a random variable): $m_n = E\{x^n\} = \int_{-\infty}^{\infty} x^n g(x) dx$, where g (•) is the probability distribution function of x. For example, if x is normally distributed according to $x \sim N(\mu, \sigma^2)$, then $\mu$ and $\sigma^2$ are the first and second moments of x, and the pivots of x for a given channel may be expressed as $p_i = f(\mu, \sigma)$, where i denotes the index for the pivot (and, for simplicity, $\sigma$ may be used rather than $\sigma^2$ for the argument of function $f$).

In some aspects, the location of each pivot of the parameterized activation function is defined using Equation 13 below, where $p_i$ is the i-th pivot, $\mu$ is the mean of the pre-activation distribution, $\sigma^2$ is the variance or standard deviation of the pre-activation distribution (though the equation may use $\sigma$ for simplicity), and $\beta_i$ and $\alpha_i$ are trainable parameters for the i-th pivot.

$$p_i = f(\mu, \sigma) = \beta_i \mu + \alpha_i \sigma \tag{13}$$

Notably, a ReLU activation function is a special case of Equation 13, where both trainable parameters $\alpha$ and $\beta$ are zero.

In some aspects, a batch normalization operation (which is often used prior to activation functions) can be used to provide the needed $\mu$ and $\sigma$ of the pre-activations. Thus, by using the parameterized activation function defined in Equation 13, the pivots of the function are adjusted based in part on the mean and variance of the pre-activation data, rather than having the batch normalization followed by an activation with fixed (non-adaptive) pivots.

This allows the nonlinearity pivots to be specified by moments of the pre-activation distribution (e.g., μ and σ of a Gaussian distribution) in order to reflect the physical characteristics and structure of the random distribution, rather than using loosely defined offset values (e.g., fixed offsets selected manually). Shiftable and scalable pivots are enabled by recognizing the nature of pre-activation distribution biases (via the mean μ) and weights (via the variance σ), which are not always fixed (e.g., at zero). Thus, such parameterized activation functions can generalize the nonlinearity to arbitrary-mean and arbitrary-variance random distributions.

In conventional activation functions with pivots, the pivots are defined as rigid or using independent offsets, without consideration for the characteristics of the pre-activation distributions. Using Equation 13, however, the neural network can beneficially learn the ratio between the linear and nonlinear regions of the distribution for the pivots.

Therefore, regardless of how μ and σ vary along with the particular sample batch (where the mean and variance may vary from one batch to another), the disclosed parameterized activation functions recognize and adapt to the optimal ratio between linear/nonlinear regions.

For example, if network training produces $\alpha=-1$ and $\beta=1$, then Equation 13 defines $p=f(\mu, \sigma)=(1)\mu+(-1)\sigma=\mu-\sigma$, which means that the pivot automatically shifts based on the mean and scales based on the variance (or standard deviation) of the pre-activations. In contrast, conventional functions (such as ReLU) work best only when the pre-activations have a mean equal to or near zero, which is not always the case.

In the illustrated parameterized activation function 500A, the pivot (located at the intersection between range 505 and range 510) has been left-shifted using Equation 13. That is, the dashed line 503 indicates the value of $p=\beta\mu+\alpha\sigma$, where β and α were learned using training data. Thus, pre-activation values less than the value corresponding to the line 503 result in an output of zero, while pre-activations greater than or equal to this value are in the linear range of the parameterized activation function.

In some aspects, such shifting along the horizontal axis is referred to as activation normalization of the parameterized activation function, resulting in a normalized parameterized activation function.

Parameterized activation function 500B illustrates a function that has been shifted diagonally along a line y=x (or more generally, y=mx, where m may be a hyperparameter used to define the slope of the line), indicated by dashed line 517. In some aspects, this is referred to as diagonalization of the parameterized activation function. In the illustrated example, the parameterized activation function 500B includes a constant region 515 for values less than the value corresponding to line 513, while pre-activations greater than or equal to this value are in the linear range of the parameterized activation function.

Using such diagonalization, the linear region of the parameterized activation function 500B has its pivot constrained to be on the line of y=x (instead of on y=0, as is the case with normalization). In other words, the linear region of the activation function can extend lower into the x<0 region.

The diagonalization technique illustrated for the parameterized activation function 500B is particularly useful when the pre-activation distribution has a mean (or bias) value other than 0. Unlike existing nonlinearity functions (e.g., ReLU) that impose unnecessary biases on x with the pivot on y=0, diagonalization respects the linear region by correctly observing the pivot on y=x without imposing unnecessary biases on x. This is described and illustrated in more detail below, with reference to FIG. 6.

In some aspects, there may be multiple pivots of an activation function that follow the diagonalization and/or normalization constraint. Such an example is illustrated using parameterized activation function 500C.

When a parameterized activation function has multiple (e.g., M) pivots (such as the parameterized activation function 500C with M=2), all pivots $p_i$, i=0, . . . , M−1 are expressible as $p_i=f_i(\mu, \sigma)=\beta_i\mu+\alpha_i\sigma$ with the same pair of mean and variance of the pre-activation distribution (assuming a Gaussian distribution). The trainable parameter pair of $(\alpha_i, \beta_i)$, however, may be specific for each pivot $p_i$. Therefore, all pivots can adaptively shift and scale with the characteristics of the pre-activations based on the samples. Such multi-pivot shifting and scaling can significantly improve expressivity of the neural network, which results in improved inferencing. In some cases, expressivity may be directly related to the number of distinct piecewise linear regions of the network.

In the illustrated example, the parameterized activation function 500C includes first linear region 525 for pre-activation values less than the value corresponding to line 527, a constant region 530 for pre-activations having values in the range between line 527 and line 528, and another linear range 535 for pre-activations greater than or equal to the value of line 528.

Figure 6:
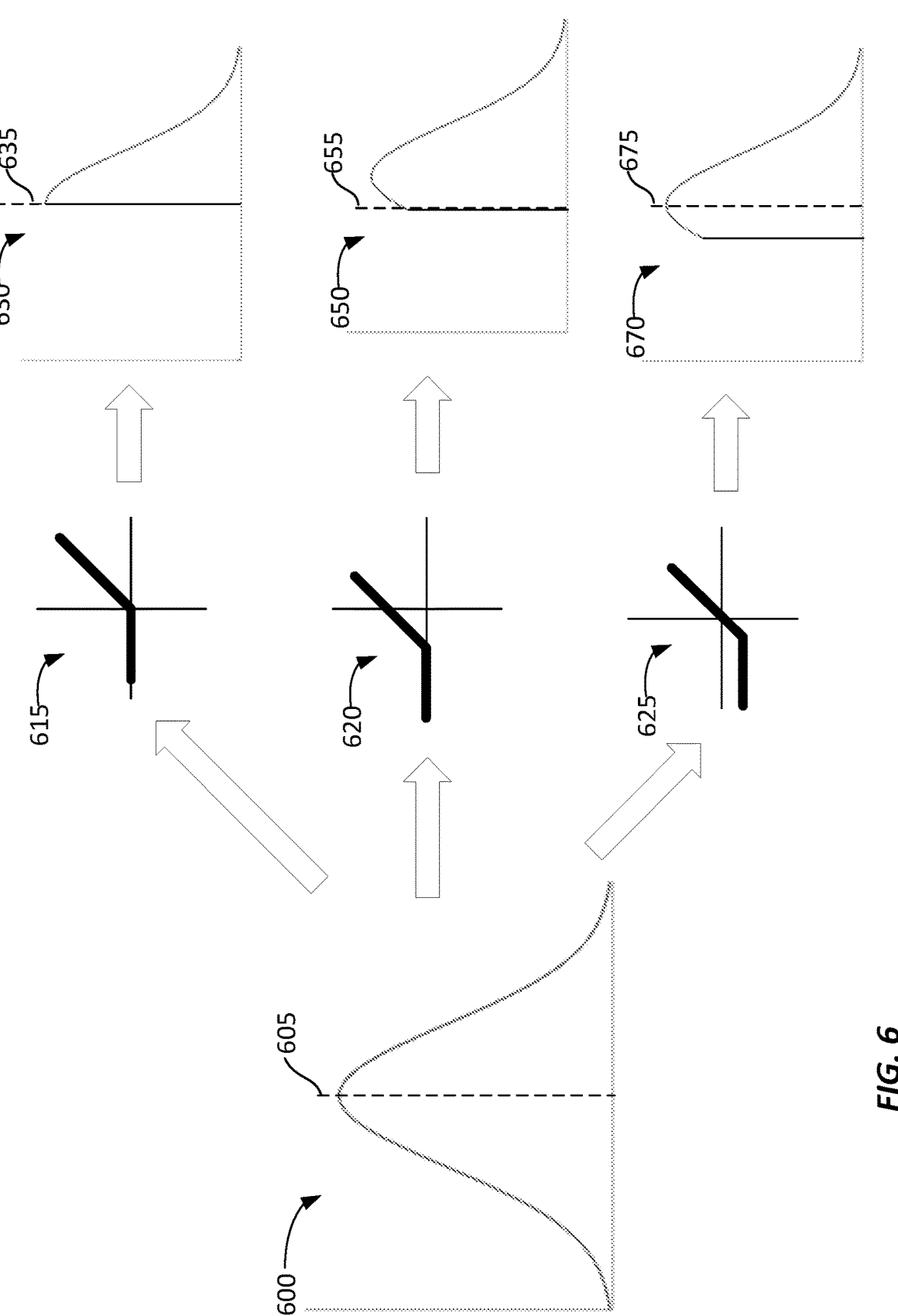
FIG. 6 depicts activation distributions resulting from various example parameterized activations functions using shifted pivots.

Example Activation Distributions Resulting from Parameterized Activation Functions Using Shifted Pivots FIG. 6 depicts example activation distributions resulting from parameterized activation functions using shifted pivots. Specifically, FIG. 6 illustrates the impacts of parameterized activation functions 615, 620, and 625 on an example pre-activation distribution 600.

In the illustrated example, the pre-activation distribution 600 is represented using a Gaussian curve with a mean of zero, indicated by dashed line 605. Although a Gaussian distribution of the pre-activations is depicted, aspects of the present disclosure can be used to conform to any distribution. In some aspects, given the size of the pre-activation data (e.g., the number of training samples), a Gaussian distribution can generally be used as a good approximation for the pre-activation data, even if it is not actually strictly Gaussian.

The activation functions 615, 620, and 625 represent a standard ReLU operation (indicated by activation function 615), a left-shifted ReLU (indicated by parameterized activation function 620), and a diagonally-shifted ReLU (indicated by parameterized activation function 625), respectively.

As illustrated, the activation function 615 results in an activation distribution 630 with a peak centered on the same mean as the pre-activation distribution 600 (e.g., a mean of zero), as indicated by the dashed line 635.

The left-shifted parameterized activation function 620, however, introduces a bias in the activation distribution 650. That is, the activation distribution 650 has a peak centered on a different mean (biased to the right), as compared to the pre-activation distribution 600 (which has a mean of zero). This biased mean is indicated by the dashed line 655. In some aspects, such a bias may be corrected using other bias parameter(s) learned during training. However, in some aspects, it is preferable to avoid introducing such bias entirely.

The diagonally-shifted parameterized activation function 625 allows a larger linear region (with a slope of one) with the diagonal shift (illustrated by the larger area under the curve of the activation distribution 670, as compared to the activation distribution 630) without imposing any bias. That is, the activation distribution 670 has a peak centered on the same mean as the pre-activation distribution 600 (which has a mean of zero), as indicated by the dashed line 675. The diagonalization, however, also allows additional values through, as compared to the standard ReLU operation. This can improve the expressive power of the model and lead to better model performance, as described above.

Figure 7:
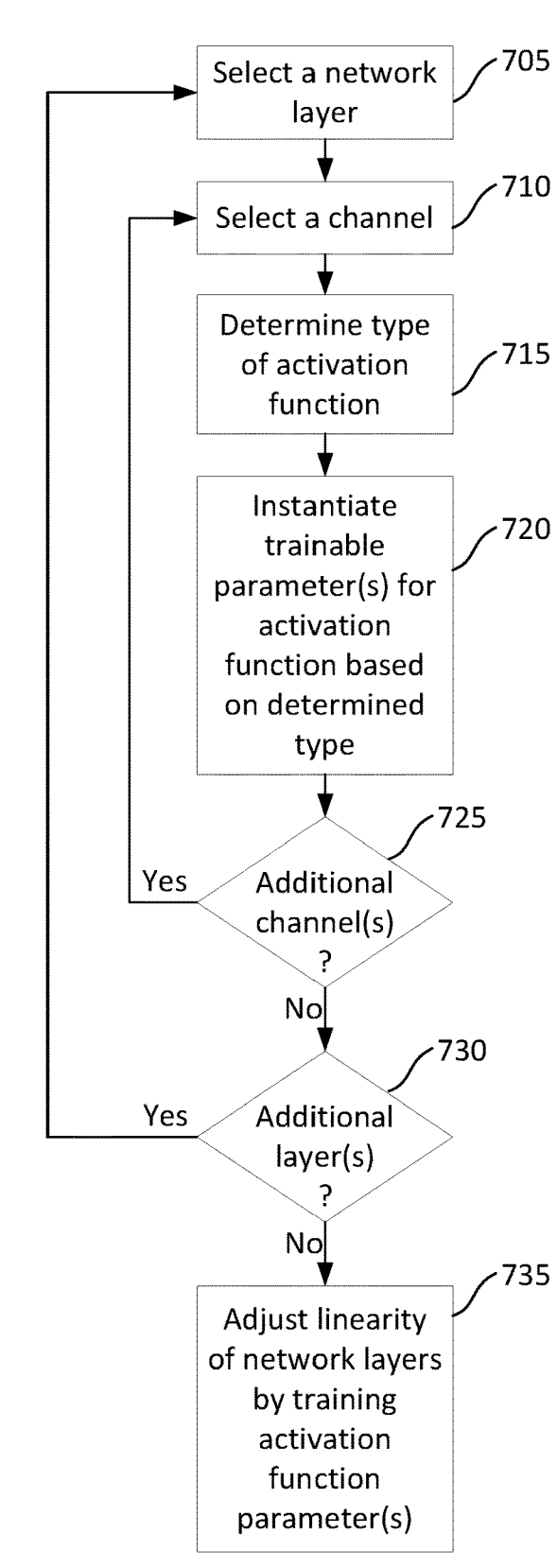
FIG. 7 is an example flow diagram illustrating a method for instantiating and training a machine learning model using parameterized activation functions.

Example Method for Instantiating and Training a Machine Learning Model Using Parameterized Activation Functions FIG. 7 is an example flow diagram illustrating a method 700 for instantiating and training a machine learning model using parameterized activation functions.

The method 700 begins at block 705, where a model training system selects a network layer. In aspects, the model training system can train artificial neural networks with any number of layers. Generally, selecting the layer can be performed using any arbitrary criteria, as the model training system will iterate through each layer during initialization. Although depicted as a sequential process for conceptual clarity, in some aspects, the model training system may process multiple layers in parallel.

At block 710, the model training system selects a channel used in the selected layer. As above, this selection may be performed using any arbitrary criteria, as the model training system will iterate through each channel during the initialization. Although depicted as a sequential process for conceptual clarity, in some aspects, the model training system may process multiple channels in parallel. Additionally, although the illustrated method 700 relates to multi-channel input, in layers with a single input channel, performance of blocks 710 and/or 725 may be optional.

The method 700 then continues to block 715, where the model training system determines the type of activation function to use for the selected channel and layer. Generally, this determination may be performed using a variety of criteria or specifications indicated by the model architecture or the user. In some aspects, various activation functions that may be selected can include a standard activation function (e.g., ReLU or swish), a parameterized function such as a symmetric or asymmetric N-oid parameterized functions (e.g., 200C or 200D in FIG. 2), a shifted activation function (e.g., normalized or diagonalized functions as illustrated by 500A, 500B, or 500C in FIG. 5, and the like). In some aspects, the user may indicate which activation function(s) should be used in each portion of the model.

In some aspects, the model training system may use the same activation function for all channels and all neurons within a given layer. In other aspects, the model training system may select different functions for different channels and/or neurons. Regardless, in some aspects, the trainable parameters are specific to each particular channel and layer.

In some aspects, determining the type of activation function includes determining whether to use a standard or parameterized activation function. For example, the model training system may determine to only use parameterized activation functions for bottleneck layers or for particular channels (e.g., based on a user-specified architecture or preference).

Additionally, in some aspects, determining the type of function includes determining whether the layer is designated as a linear or nonlinear layer. For example, when adapting an existing architecture, some layers may be linear (e.g., the final output layer) while others are nonlinear (e.g., the internal layers). In one such aspect, the model training system may use parameterized activation functions for some layers (e.g., nonlinear layers) while using standard functions in others (e.g., in linear layers). In some aspects, however, the model training system can use parameterized functions in all layers, relying on the training process to shape the linearity of each activation function.

Once the type of activation function has been determined for the selected layer and channel, the method 700 continues to block 720, where the model training system instantiates the relevant trainable parameter(s) for the activation function, based on the determined type.

For example, if the model training system determines to use an N-oid function (e.g., based on a user-provided specification or instruction), the model training system can instantiate a bias B for the function. Further, if the model training system determines to use pivot shifting techniques (e.g., based on a user-provided specification or instruction), the model training system can instantiate a trainable parameter pair of $(\alpha_i, \beta_i)$ for each pivot of the activation function. Of course, if the model training system determines to use a standard (non-parameterized) activation function (e.g., because the user has declined to use a parameterized function), the model training system can refrain from instantiating any corresponding trainable parameters for the activation function.

In some aspects, the particular value used to instantiate the trainable parameters can be selected based on defined criteria relating to the type of layer and/or function. As discussed above, an N-oid parameterized activation function can generally approximate or match a linear function when B equals or approaches zero. Thus, in one aspect, if the selected layer is traditionally linear (or if the N-oid is being used to replace a linear function), the model training system can instantiate the trainable parameter B to zero (or close to zero). Further, if the trainable parameter B is sufficiently large, the N-oid function replicates a ReLU function. In some aspects, therefore, the model training system may initiate the parameter B to a large value when the layer is traditionally nonlinear (e.g., when the N-oid is being used to replace a nonlinear function in an existing architecture).

When the relevant trainable parameters have been instantiated, the method 700 continues to block 725, where the model training system determines whether there are any additional channels in the selected layer. If so, the method 700 returns to block 710. If not, the method 700 continues to block 730.

At block 730, the model training system determines whether there are any additional layers in the neural network. If so, the method 700 returns to block 705. Otherwise, the method 700 continues to block 735.

At block 735, the model training system adjusts the linearity of each network layer by training the instantiated activation function parameters (e.g., B, $\alpha_i$, and/or $\beta_i$) in the model. As discussed above, this training process is generally performed alongside the training of the other parameters (e.g., weights and biases as shown in FIG. 1) in the model, and can be performed using various optimization techniques, such as stochastic and/or batch gradient descent, based on training data.

Figure 8:
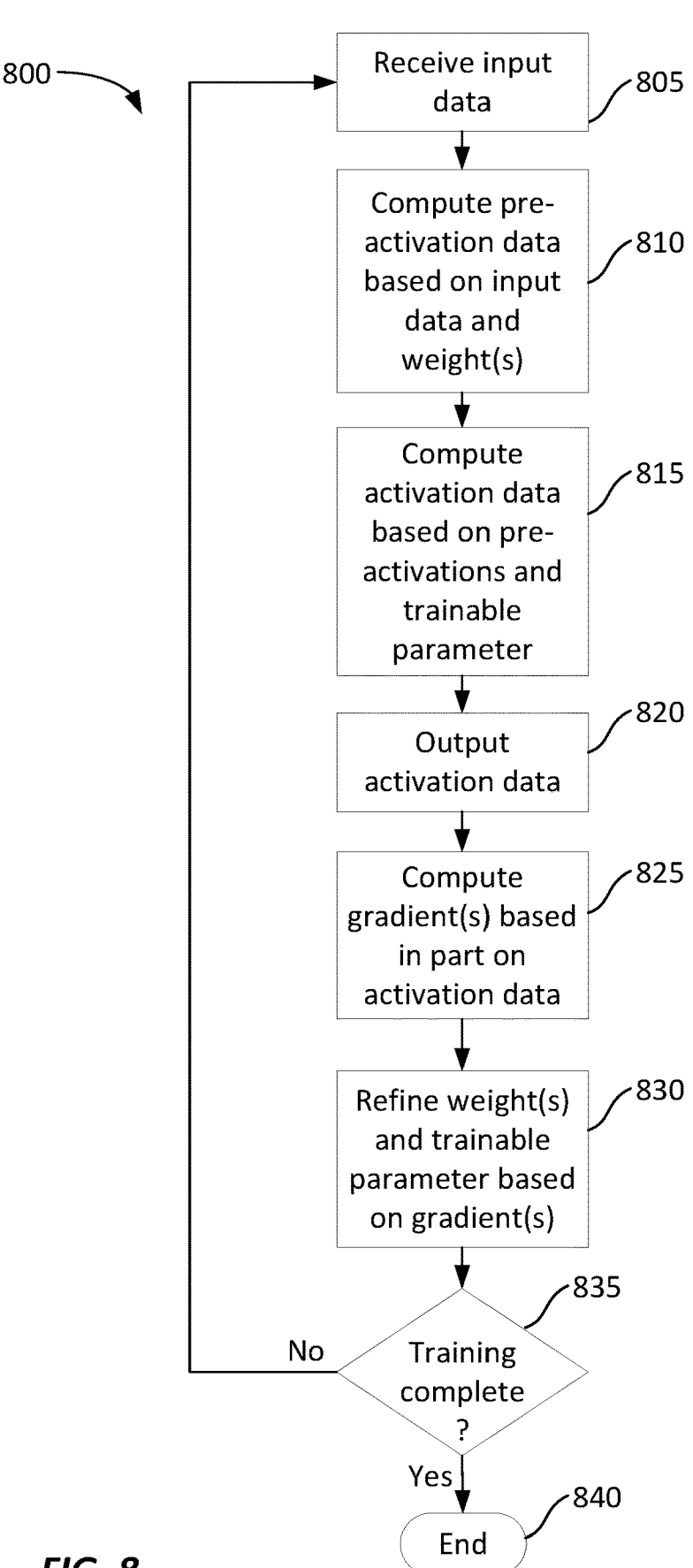
FIG. 8 is an example flow diagram illustrating a method for training a machine learning model using a parameterized activation function.

Example Method for Training a Machine Learning
Model Using a Parameterized Activation Function FIG. 8 is an example flow diagram illustrating a method
800 for training a machine learning model using a param-
eterized activation function.

In some aspects, the method 800 provides additional
detail for block 735 in FIG. 7, from the perspective of a
single neuron in the model. That is, the method 800 may be
performed for each neuron during training. Although
depicted as a sequential and discrete process for each
neuron, in some aspects, the model training system may
perform the method 800 for multiple neurons in a parallel
fashion.

The method 800 begins at block 805, where a model
training system receives a set of input data (e.g., inputs 105
in FIG. 1) for the neuron (e.g., a tensor of input data values).
The input data may be received from one or more prior
layers or neurons, or as original input to the network (e.g.,
if the neuron is in the first layer).

At block 810, the model training system computes pre-
activation data based on the input data and corresponding
weight(s) and any biases. For example, as discussed above,
the model training system may compute the weighted aver-
age or weighted sum of the input data values.

The method 800 then continues to block 815, where the
model training system computes activation data based on the
computed pre-activation data and its activation function
(which may be parameterized by one or more trainable
parameters).

At block 820, the resulting activation can then be output
from the neuron (e.g., to one or more subsequent neurons or
layers, or as final output from the model).

At block 825, the model training system computes one or
more gradient(s) for the neuron based at least in part on the
computed activation data. For example, the activation data
may be passed to one or more other neurons, which each
compute respective activation data. In this way, the com-
puted activation data for the neuron may propagate through
the model until it reaches an output layer, where it is used to
create the final output.

In an aspect, this output is then used to compute a loss
(e.g., based on the output and a ground truth for the training
input), which is used to compute gradients for the model
parameters (e.g., using back propagation). Although sto-
chastic gradient descent is described for conceptual clarity,
in aspects, the model training system may also or alterna-
tively use batch gradient descent.

Generally, a respective gradient is computed for each
respective parameter of the model, where each gradient
indicates a magnitude and direction of change for the
corresponding parameter to reduce the loss. In some aspects,
therefore, the model training system can compute a respec-
tive gradient for each trainable parameter of the activation
function for the neuron, as well as respective gradients for
each weight and/or bias.

At block 830, the model training system refines the
weight(s) and/or bias as well as the trainable parameter(s)
for the parameterized activation function based on the
computed gradients. In this way, the weights and the acti-
vation function are adapted based on the training data. This
allows the model training system to dynamically adjust the
linearity of the activation function(s) based on the training
data.

At block 835, the model training system determines
whether the training has completed. This may include, for
example, determining whether any additional training batches or epochs remain, determining whether any training
data remains, and the like. If training has not completed, the
method 800 returns to block 805. If training is complete, the
method 800 terminates at block 840.

After training (which may be performed sequentially for
each neuron, and/or entirely or partially in parallel the
neurons), the model training system can deploy the model,
with its parameterized activation functions, for runtime use.
That is, the trainable parameters of the parameterized acti-
vation functions (as well as the weights and other parameters
of the model) can be frozen, and the final values of these
parameters can be used to generate output for the model
based on new input data.

Figure 9:
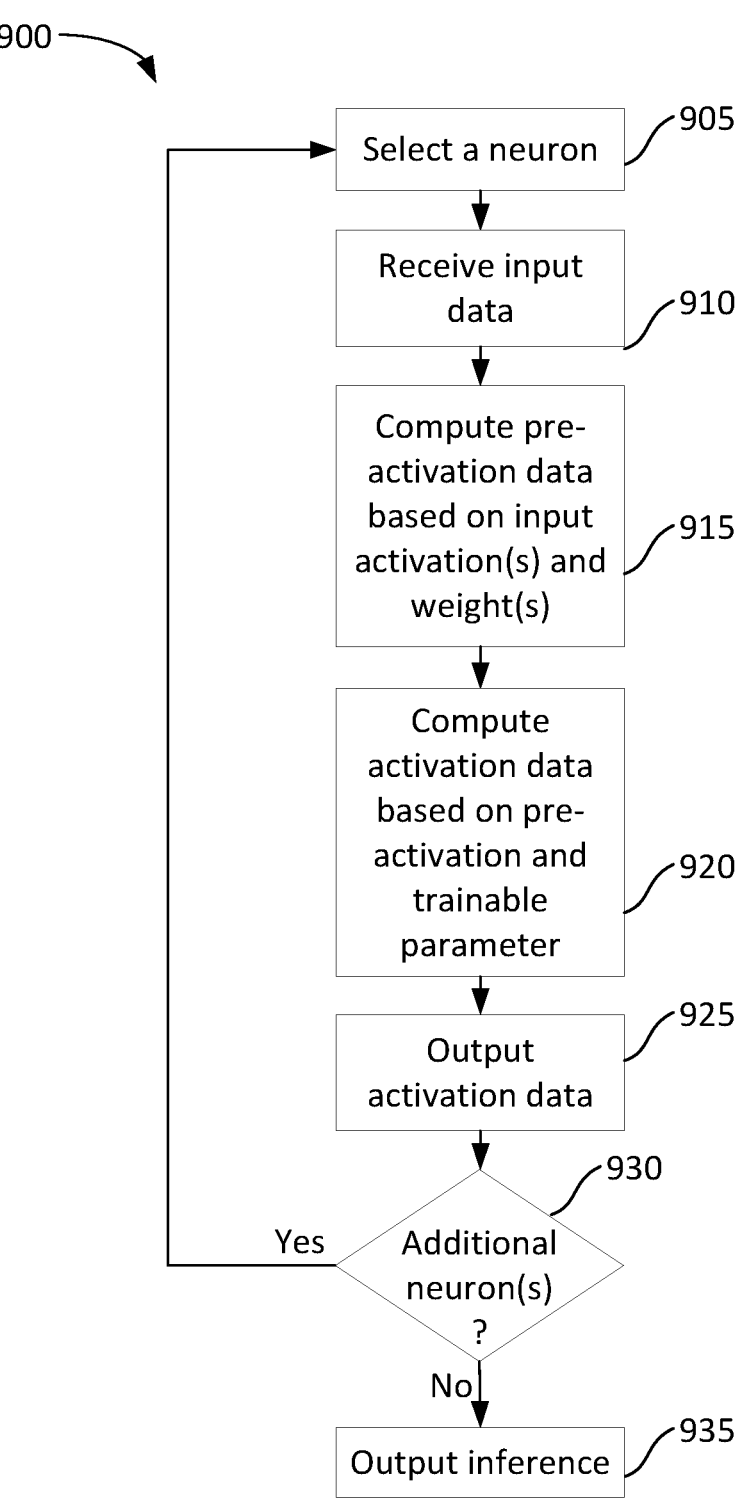
FIG. 9 is an example flow diagram illustrating a method for generating an inference using a machine learning model including a parameterized activation function.

Example Method for Generating an Inference
Using a Machine Learning Model Including a
Parameterized Activation Function FIG. 9 is an example flow diagram illustrating a method
900 for generating an inference using a machine learning
model including a parameterized activation function.

In some aspects, the method 900 can be used to process
data using trained models (e.g., trained using the methods
700 and/or 800). The method 900 may be performed by the
same system that trained the model, or by a different system.
That is, the training and inferencing may be performed on
the same system or on different systems.

The method 900 begins at block 905, where an inferenc-
ing system selects a neuron in the trained model. As data is
generally processed sequentially by layers of the model, the
inferencing system may generally select neurons from ear-
lier layers prior to selecting neurons from subsequent layers.
Within a given layer, however, the selection may be arbitrary
as all of the neurons will be selected during the process. For
conceptual clarity, the method 900 depicts an iterative
process repeated for each neuron. However, in aspects, the
inferencing system may instead process data for any number
of neurons in parallel.

At block 910, the inferencing system receives input data
for the selected neuron. As discussed above, these input
activations may be the original input to the model, or may
be activations generated by one or more prior neurons.

At block 915, the inferencing system computes a pre-
activation for the neuron based on the received input data,
and the corresponding set of weights and/or biases (which
were learned during the training process). For example, the
inferencing system may compute the weighted sum or
average of the input activations, such as shown in FIG. 1.

The method 900 continues to block 920, where the
inferencing system computes an activation for the neuron
based on the pre-activation and the activation function for
the neuron, which is parameterized using one or more
trainable parameters learned during training. In this way, the
inferencing system computes outputs based on the learned
weights and activation parameters.

At block 925, the inferencing system outputs this activa-
tion data to one or more subsequent neurons (or as output
from the model).

At block 930, the inferencing system determines whether
there are one or more additional neurons that have not-yet
been processed. If so, the method 900 returns to block 905.

If all neurons have been used to process the input data, the
method 900 continues to block 935, where the inferencing
system outputs an inference for the input data.

In this way, the inferencing system can use trained model
including one or more parameterized activation functions to
generate inferences. As discussed above, these parameterized activation functions generally have higher expressive power and can lead to improved model accuracy, as compared to conventional activation functions.

Figure 10:
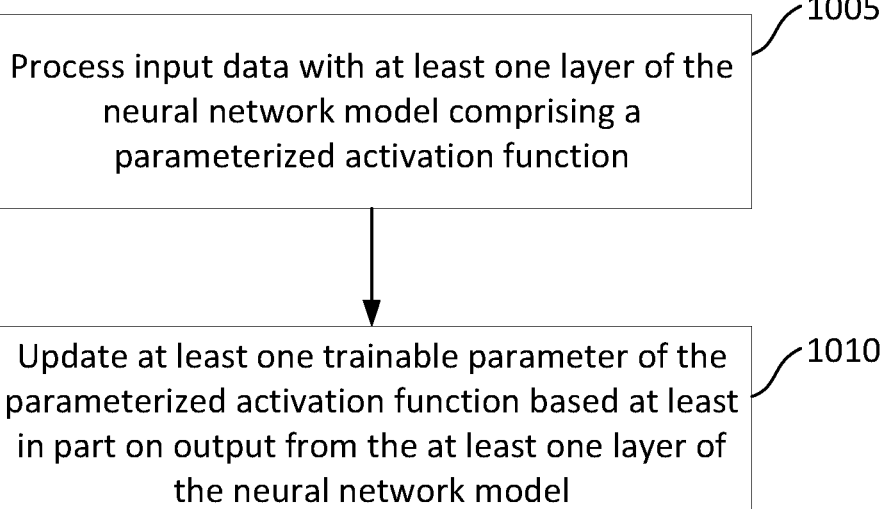
FIG. 10 is an example flow diagram illustrating a method for training a parameterized activation function in a machine learning model.

Example Method for Training a Parameterized Activation Function in a Machine Learning Model FIG. 10 is an example flow diagram illustrating a method 1000 for training a parameterized activation function in a machine learning model.

The method 1000 begins at block 1005, where a model training system processes input data with at least one layer of the neural network model comprising a parameterized activation function.

At block 1010, the model training system updates at least one trainable parameter of the parameterized activation function based at least in part on output from the at least one layer of the neural network model.

In some aspects, the at least one trainable parameter adjusts a range over which the parameterized activation function is nonlinear. In some aspects, the at least one trainable parameter adjusts a location of at least one pivot of the parameterized activation function.

In some aspects, the method 1000 further comprises initializing the at least one trainable parameter of the parametrized activation function to a value of zero. In some aspects, the method 1000 further comprises initializing the at least one trainable parameter of the parametrized activation function to a non-zero value.

In some aspects, the parameterized activation function comprises: a first linear region for input values smaller than a first pivot value; a constant region for input values between the first pivot value and a second pivot value; and a second linear region for input values greater than the second pivot value, wherein the at least one trainable parameter of the parameterized activation function changes a distance between the first pivot value and the second pivot value.

In some aspects, the parameterized activation function receives an input activation and outputs an output activation for a subsequent layer in the neural network model, wherein if the input activation is less than the first pivot value, the output activation is the input activation plus the trainable parameter; if the input activation is greater than or equal to the first pivot value and less than the second pivot value, the output activation is zero; and if the input activation is greater than or equal to the second pivot value, the output activation is the input activation minus the trainable parameter.

In some aspects, the parameterized activation function is computed using two applications of a max function (or, in some cases, a rectified linear unit (ReLU) activation function).

In some aspects, the parameterized activation function is asymmetric and is defined as $\rho(x)-\rho(-x-\beta)$, where: $\rho$ is the ReLU activation function; x is a pre-activation for the first layer; and $\beta$ is the at least one trainable parameter of the parameterized activation function.

In some aspects, the parameterized activation function is symmetric and is defined as $\rho(x-\beta)-\rho(-x-\beta)$, where: $\rho$ is the ReLU activation function; x is a pre-activation for the first layer; and $\beta$ is the at least one trainable parameter of the parameterized activation function.

In some aspects, processing pre-activation data with the parameterized activation function requires no multiplication of pre-activation data values.

In some aspects, the at least one layer comprises a plurality of input channels, and the parameterized activation function comprises at least one trainable parameter for each input channel.

In some aspects, the at least one pivot of the parameterized activation function corresponds to a non-differentiable transition between a first region of the parameterized activation function and a second region of the parameterized activation function.

In some aspects, the location of the at least one pivot of the parameterized activation function is defined as a function of the at least one trainable parameter and at least one value of a distribution of input pre-activation values for the at least one layer of the neural network model.

In some aspects, the at least one value of the distribution of input pre-activation values for the at least one layer of the neural network model are computed using a batch normalization operation prior to the at least one layer.

In some aspects, the at least one value of the distribution of input pre-activation values comprises a mean value and a variance value for the distribution, and the at least one trainable parameter comprises a first trainable parameter associated with the mean value and a second trainable parameter associated with the variance value.

In some aspects, the parameterized activation function is defined as max(0, p), where p is defined based at least in part on the at least one trainable parameter of the parameterized activation function.

In some aspects, p is defined as $\beta\mu+\alpha\sigma$, wherein: $\beta$ and $\alpha$ are trainable parameters of the parameterized activation function, and $\mu$ and $\sigma$ are values of a distribution of input pre-activation values for the at least one layer of the neural network model.

In some aspects, each respective pivot of the parameterized activation function is associated with a corresponding one or more trainable parameters.

In some aspects, updating the at least one trainable parameter of the parameterized activation function causes a location of the at least one pivot of the parameterized activation function to change along a horizontal axis at y=0.

In some aspects, updating the at least one trainable parameter of the parameterized activation function causes a location of the at least one pivot of the parameterized activation function to change along a line defined as y=mx, wherein m is a hyperparameter of the parameterized activation function.

Figure 11:
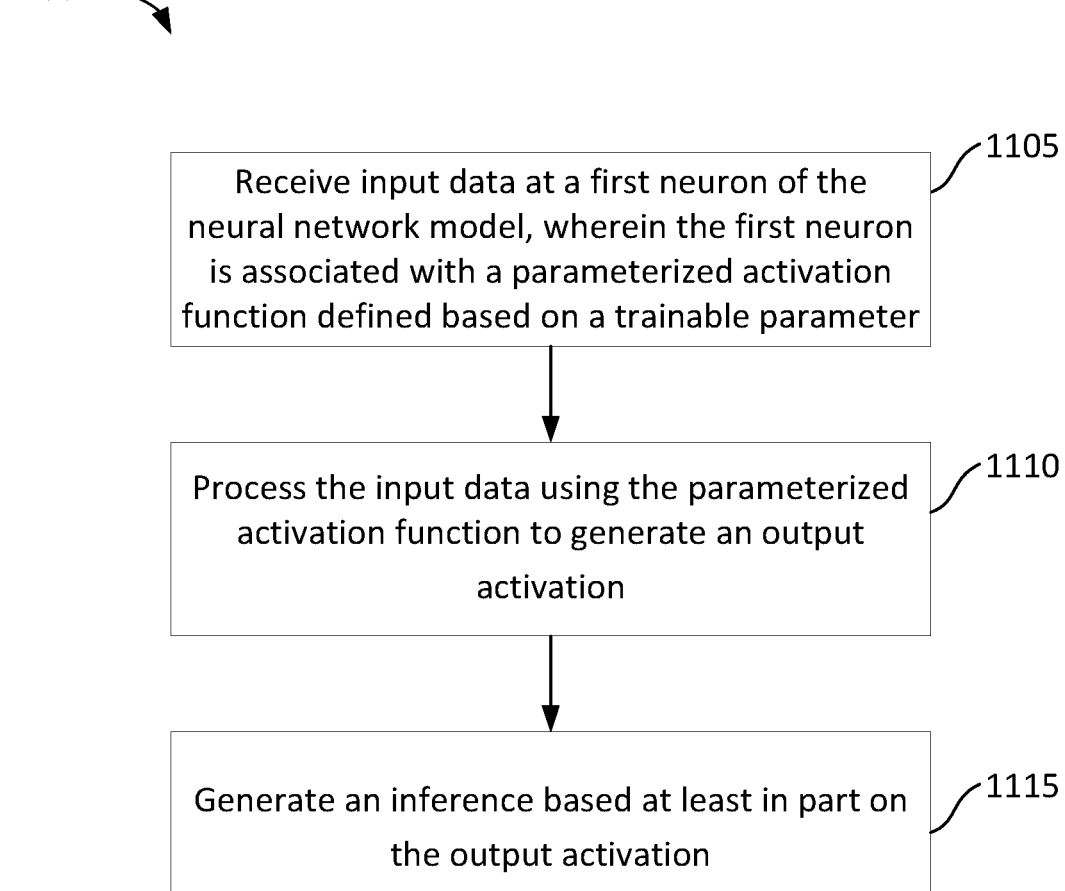
FIG. 11 is an example flow diagram illustrating a method for generating an output inference using a parameterized activation function.

Example Method for Generating an Output Activation Using a Parameterized Activation Function FIG. 11 is an example flow diagram illustrating a method 1100 for generating an output inference using a parameterized activation function.

The method 1100 begins at block 1105, where an inferencing system receives input data at a first neuron of the neural network model, wherein the first neuron is associated with a parameterized activation function defined based on a trainable parameter.

At block 1110, the inferencing system processes the input data using the parameterized activation function to generate an output activation.

At block 1115, the inferencing system generates an inference based at least in part on the output activation.

Example Processing System for Parameterized Activation Functions

In some aspects, the architectures and activation functions described with reference to FIGS. 1-6, as well as the methods and workflows described with respect to FIGS. 7-11 may be implemented on one or more devices or systems. For example, training and inferencing may be performed by a single device or distributed across multiple devices. Often a model will be trained on a powerful computing device and then deployed to many other devices to perform inferencing.

Figure 12:
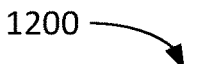
FIG. 12 depicts an example processing system configured to perform various aspects of the present disclosure.

FIG. 12 depicts an example processing system configured to perform various aspects of the present disclosure, including, for example, the methods described with respect to FIGS. 7-11.

Processing system 1200 includes a central processing unit (CPU) 1202, which in some examples may be a multi-core CPU. Instructions executed at the CPU 1202 may be loaded, for example, from a program memory associated with the CPU 1202 or may be loaded from a memory 1214.

Processing system 1200 also includes additional processing components tailored to specific functions, such as a graphics processing unit (GPU) 1204, a digital signal processor (DSP) 1206, and a neural processing unit (NPU) 1208.

Though not depicted in FIG. 12, NPU 1208 may be implemented as a part of one or more of CPU 1202, GPU 1204, and/or DSP 1206.

The processing system 1200 also includes input/output 1210. In some aspects, the input/output 1210 can include one or more network interfaces, allowing the processing system 1200 to be coupled to a one or more other devices or systems via a network (such as the Internet).

Although not included in the illustrated aspect, the processing system 1200 may also include one or more additional input and/or output devices, such as screens, physical buttons, speakers, microphones, and the like.

Processing system 1200 also includes memory 1214, which is representative of one or more static and/or dynamic memories, such as a dynamic random access memory, a flash-based static memory, and the like.

In this example, memory 1214 includes computer-executable components, which may be executed by one or more of the aforementioned processors of processing system 1200. Additionally, though illustrated as components in memory 1214, in some aspects, some or all of the operations may be performed using hardware (rather than as software executed by a processor).

In this example, memory 1214 includes a training component 1220 and an inferencing component 1222. The training component 1220 may generally be configured to compute gradients and updated model parameters using parameterized activation functions, as discussed above. The inferencing component 1222 is generally configured to compute inferences using such trained models.

The memory 1214 also includes a set of model parameters 1230, which generally correspond to weights and trainable activation function parameters in a neural network, as discussed above.

The depicted components, and others not depicted, may be configured to perform various aspects of the methods described herein.

EXAMPLE CLAUSES

Clause 1: A method for training a neural network model, comprising: processing input data with at least one layer of the neural network model comprising a parameterized activation function; and updating at least one trainable parameter of the parameterized activation function based at least in part on output from the at least one layer of the neural network model, wherein the at least one trainable parameter defines at least one of a range over which the parameterized activation function is nonlinear or a shape of the parameterized activation function.

Clause 2: The method according to Clause 1, further comprising initializing the at least one trainable parameter of the parameterized activation function to a value of zero.

Clause 3: The method according to any one of Clauses 1-2, further comprising initializing the at least one trainable parameter of the parameterized activation function to a non-zero value.

Clause 4: The method according to any one of Clauses 1-3, wherein the parameterized activation function comprises: a first linear region for input values smaller than a first pivot value; a constant region for input values between the first pivot value and a second pivot value; and a second linear region for input values greater than the second pivot value, wherein the at least one trainable parameter of the parameterized activation function changes a distance between the first pivot value and the second pivot value.

Clause 5: The method according to any one of Clauses 1-4, wherein the parameterized activation function receives an input activation and outputs an output activation for a subsequent layer in the neural network model, and wherein: if the input activation is less than the first pivot value, the output activation is the input activation plus the trainable parameter; if the input activation is greater than or equal to the first pivot value and less than the second pivot value, the output activation is zero; and if the input activation is greater than or equal to the second pivot value, the output activation is the input activation minus the trainable parameter.

Clause 6: The method according to any one of Clauses 1-5, wherein the parameterized activation function is computed using two applications of a max function.

Clause 7: The method according to any one of Clauses 1-6, wherein the parameterized activation function is asymmetric and is defined as $\rho(x)-\rho(-x-\beta)$, where: $\rho$ is the ReLU activation function; x is a pre-activation for the first layer; and $\beta$ is the at least one trainable parameter of the parameterized activation function, wherein $\beta$ is greater than or equal to zero.

Clause 8: The method according to any one of Clauses 1-7, herein the parameterized activation function is symmetric and is defined as $\rho(x-\beta)-\rho(-x-\beta)$, where: $\rho$ is the ReLU activation function; x is a pre-activation for the first layer; and $\beta$ is the at least one trainable parameter of the parameterized activation function, wherein $\beta$ is greater than or equal to zero.

Clause 9: The method according to any one of Clauses 1-8, wherein processing pre-activation data with the parameterized activation function requires no multiplication of pre-activation data values.

Clause 10: The method according to any one of Clauses 1-9, wherein: the at least one layer comprises a plurality of input channels, and the parameterized activation function comprises at least one trainable parameter for each input channel.

Clause 11: A method for training a neural network, comprising: processing input data with at least one layer of the neural network model comprising a parameterized activation function; and updating at least one trainable parameter of the parameterized activation function based at least in part on output from the at least one layer of the neural network model, wherein the at least one trainable parameter adjusts a location of at least one pivot of the parameterized activation function.

Clause 12: The method according to Clause 11, wherein the at least one pivot of the parameterized activation function corresponds to a non-differentiable transition between a first region of the parameterized activation function and a second region of the parameterized activation function.

Clause 13: The method according to any one of Clauses 11-12, wherein the location of the at least one pivot of the parameterized activation function is defined as a function of the at least one trainable parameter and at least one value of a distribution of input pre-activation values for the at least one layer of the neural network model.

Clause 14: The method according to any one of Clauses 11-13, wherein the at least one value of the distribution of input pre-activation values for the at least one layer of the neural network model are computed using a batch normalization operation prior to the at least one layer.

Clause 15: The method according to any one of Clauses 11-14, wherein: the at least one value of the distribution of input pre-activation values comprises a mean value and a variance value for the distribution, and the at least one trainable parameter comprises a first trainable parameter associated with the mean value and a second trainable parameter associated with the variance value.

Clause 16: The method according to any one of Clauses 11-15, wherein the parameterized activation function is defined as $max(0, p)$, where p is defined based at least in part on the at least one trainable parameter of the parameterized activation function.

Clause 17: The method according to any one of Clauses 11-16, wherein p is defined as $\beta\mu+\alpha\sigma$, wherein: $\beta$ and $\alpha$ are trainable parameters of the parameterized activation function, and $\mu$ and $\sigma$ are values of a distribution of input pre-activation values for the at least one layer of the neural network model.

Clause 18: The method according to any one of Clauses 11-17, wherein each respective pivot of the parameterized activation function is associated with a corresponding one or more trainable parameters.

Clause 19: The method according to any one of Clauses 11-18, wherein updating the at least one trainable parameter of the parameterized activation function causes a location of the at least one pivot of the parameterized activation function to change along a horizontal axis at y=0.

Clause 20: The method according to any one of Clauses 11-19, wherein updating the at least one trainable parameter of the parameterized activation function causes a location of the at least one pivot of the parameterized activation function to change along a line defined as y=mx, wherein m is a hyperparameter of the parameterized activation function.

Clause 21: The method according to any one of Clauses 11-20, wherein the parameterized activation function is one of a monotonic Knoll (MK) N-oid parameterized activation function or an non-monotonic Knoll (NK) N-oid activation function.

Clause 22: The method according to any one of Clauses 11-21, wherein the parameterized activation function is an inverse parameterized activation function with two linear ranges and a constant range.

Clause 23: The method according to any one of Clauses 11-22, wherein the parameterized activation function is one of a step parameterized activation function or an inverse step activation function.

Clause 24: The method according to any one of Clauses 11-23, wherein the parameterized activation function is one of a transitional slope parameterized activation function or an inverse transitional slope activation function.

Clause 25: The method according to any one of Clauses 11-24, wherein the parameterized activation function is one of an NK N-oid activation function with linear portions after pivot points parameterized activation function or an NK N-oid variant activation function.

Clause 26: A method, comprising: processing input data with at least one layer of the neural network model comprising a parameterized activation function; and updating at least one trainable parameter of the parameterized activation function based at least in part on output from the at least one layer of the neural network model.

Clause 27: The method according to Clause 26, wherein the at least one trainable parameter adjusts at least one of a range over which the parameterized activation function is nonlinear or a shape of the parameterized activation function.

Clause 28: A method, comprising: receiving input data at a first neuron of the neural network model, wherein the first neuron is associated with a parameterized activation function defined based on a trainable parameter that adjusts at least one of a range over which the parameterized activation function is nonlinear or a shape of the parameterized activation function; processing the input data using the parameterized activation function to generate an output activation; and generating an inference based at least in part on the output activation.

Clause 29: A system, comprising: a memory comprising computer-executable instructions; and one or more processors configured to execute the computer-executable instructions and cause the processing system to perform a method in accordance with any one of Clauses 1-28.

Clause 30: A system, comprising means for performing a method in accordance with any one of Clauses 1-28.

Clause 31: A non-transitory computer-readable medium comprising computer-executable instructions that, when executed by one or more processors of a processing system, cause the processing system to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a neural network model, comprising:

processing input data with at least one layer of the neural network model comprising a parameterized activation function, wherein the parameterized activation function comprises:

a first monotonic function region for input values of the input data smaller than a first pivot value, and a second monotonic function region for input values of the input data greater than a second pivot value, wherein the first and second monotonic function regions have a same monotonicity;

updating at least one trainable parameter of the parameterized activation function based at least in part on output from the at least one layer of the neural network model, wherein the at least one trainable parameter defines at least one of a range over which the parameterized activation function is nonlinear or a shape of the parameterized activation function;

generating an output of the neural network model based in part on processing data using the at least one trainable parameter of the parameterized activation function; and deploying the neural network model comprising the at least one trainable parameter for inferencing.

2. The method of claim 1, further comprising initializing the at least one trainable parameter of the parameterized activation function to a value of zero.

3. The method of claim 1, further comprising initializing the at least one trainable parameter of the parameterized activation function to a non-zero value.

4. The method of claim 1, wherein:

the parameterized activation function further comprises a constant region for input values of the input data between the first pivot value and a second pivot value, and the at least one trainable parameter of the parameterized activation function changes a distance between the first pivot value and the second pivot value.

5. The method of claim 4, wherein the parameterized activation function receives an input activation and outputs an output activation for a subsequent layer in the neural network model, and wherein:

if the input activation is less than the first pivot value, the output activation is the input activation plus the trainable parameter;

if the input activation is greater than or equal to the first pivot value and less than the second pivot value, the output activation is zero; and if the input activation is greater than or equal to the second pivot value, the output activation is the input activation minus the trainable parameter.

6. The method of claim 1, wherein the parameterized activation function is computed using two applications of a max function.

7. The method of claim 6, wherein the parameterized activation function is asymmetric and is defined as $p(x)-p(-x-l)$, where:

p is the ReLU activation function;

x is a pre-activation for the first layer; and fl is the at least one trainable parameter of the parameterized activation function, wherein # is greater than or equal to zero.

8. The method of claim 6, wherein the parameterized activation function is symmetric and is defined as $p(x-\#l)-p(-x-/l)$, where:

p is the ReLU activation function;

x is a pre-activation for the first layer; and fl is the at least one trainable parameter of the parameterized activation function, wherein # is greater than or equal to zero.

9. The method of claim 1, wherein processing pre-activation data with the parameterized activation function requires no multiplication of pre-activation data values.

10. The method of claim 1, wherein:

the at least one layer comprises a plurality of input channels, and the parameterized activation function comprises at least one trainable parameter for each input channel.

11. A method for training a neural network model, comprising:

processing input data with at least one layer of the neural network model comprising a parameterized activation function;

updating at least one trainable parameter of the parameterized activation function based at least in part on output from the at least one layer of the neural network model, wherein:

the at least one trainable parameter adjusts a location of at least one pivot of the parameterized activation function, and the location of the at least one pivot of the parameterized activation function is defined as a function of the at least one trainable parameter and at least one value of a distribution of input pre-activation values for the at least one layer of the neural network model;

generating an output of the neural network model based in part on processing data using the at least one trainable parameter of the parameterized activation function; and deploying the neural network model comprising the at least one trainable parameter for inferencing.

12. The method of claim 11, wherein the at least one pivot of the parameterized activation function corresponds to a non-differentiable transition between a first region of the parameterized activation function and a second region of the parameterized activation function.

13. The method of claim 11, wherein the at least one value of the distribution of input pre-activation values for the at least one layer of the neural network model is computed using a batch normalization operation prior to the at least one layer.

14. The method of claim 11, wherein:

the at least one value of the distribution of input pre-activation values comprises a mean value and a variance value for the distribution, and the at least one trainable parameter comprises a first trainable parameter associated with the mean value and a second trainable parameter associated with the variance value.

15. The method of claim 11, wherein the parameterized activation function is defined as $\max(0,p)$, where p is defined based at least in part on the at least one trainable parameter of the parameterized activation function.

16. The method of claim 15, wherein p is defined as fip+aa, wherein:

3 and a are trainable parameters of the parameterized activation function, and y and a are values of a distribution of input pre-activation values for the at least one layer of the neural network model.

17. The method of claim 11, wherein each respective pivot of the parameterized activation function is associated with a corresponding one or more trainable parameters.

18. The method of claim 11, wherein updating the at least one trainable parameter of the parameterized activation function causes a location of the at least one pivot of the parameterized activation function to change along a horizontal axis at y=0.

19. A method for training a neural network model, comprising:

processing input data with at least one layer of the neural network model comprising a parameterized activation function;

updating at least one trainable parameter of the parameterized activation function based at least in part on output from the at least one layer of the neural network model, wherein updating the at least one trainable parameter of the parameterized activation function causes a location of at least one pivot of the parameterized activation function to change along a line defined as y=mx, wherein m is a hyperparameter of the parameterized activation function;

generating an output of the neural network model based in part on processing data using the at least one trainable parameter of the parameterized activation function; and deploying the neural network model comprising the at least one trainable parameter for inferencing.

20. A processing system comprising:

memory comprising computer-executable instructions; and one or more processors configured to execute the computer-executable instructions and cause the processing system to perform an operation for training a neural network model, the operation comprising:

processing input data with at least one layer of the neural network model comprising a parameterized activation function, wherein the parameterized activation function comprises:

a first monotonic function region for input values of the input data smaller than a first pivot value, and a second monotonic function region for input values of the input data greater than a second pivot value, wherein the first and second monotonic function regions have a same monotonicity;

updating at least one trainable parameter of the parameterized activation function based at least in part on output from the at least one layer of the neural network model;

generating an output of the neural network model based in part on processing data using the at least one trainable parameter of the parameterized activation function; and deploying the neural network model comprising the at least one trainable parameter for inferencing.

21. The processing system of claim 20, wherein the at least one trainable parameter adjusts at least one of a range over which the parameterized activation function is nonlinear or a shape of the parameterized activation function.

22. The processing system of claim 21, wherein:

the parameterized activation function further comprises a constant region for input values of the input data between the first pivot value and a second pivot value, and the at least one trainable parameter of the parameterized activation function changes a distance between the first pivot value and the second pivot value.

23. The processing system of claim 22, wherein the parameterized activation function receives an input activation and outputs an output activation for a subsequent layer in the neural network model, and wherein:

if the input activation is less than the first pivot value, the output activation is the input activation plus the trainable parameter;

if the input activation is greater than or equal to the first pivot value and less than the second pivot value, the output activation is zero; and if the input activation is greater than or equal to the second pivot value, the output activation is the input activation minus the trainable parameter.

24. The processing system of claim 21, wherein the parameterized activation function is asymmetric and is defined as p(x)−p(−x−[OCR CHECK] where:

p is a rectified linear unit (ReLU) activation function;

x is a pre-activation for the first layer; and

3 is the at least one trainable parameter of the parameterized activation function, wherein #3 is greater than or equal to zero.

25. The processing system of claim 20, wherein the at least one trainable parameter adjusts a location of at least one pivot of the parameterized activation function.

26. The processing system of claim 25, wherein updating the at least one trainable parameter of the parameterized activation function causes a location of the at least one pivot of the parameterized activation function to change along a line defined as y=mx, wherein m is a hyperparameter of the parameterized activation function.

27. A processing system comprising:

memory comprising computer-executable instructions; and one or more processors configured to execute the computer-executable instructions and cause the processing system to perform an operation for training a neural network model, the operation comprising:

processing input data with at least one layer of the neural network model comprising a parameterized activation function;

updating at least one trainable parameter of the parameterized activation function based at least in part on output from the at least one layer of the neural network model, wherein the at least one trainable parameter adjusts a location of at least one pivot of the parameterized activation function and wherein the location of the at least one pivot of the parameterized activation function is defined as a function of the at least one trainable parameter and at least one value of a distribution of input pre-activation values for the at least one layer of the neural network model;

generating an output of the neural network model based in part on processing data using the at least one trainable parameter of the parameterized activation function; and deploying the neural network model comprising the at least one trainable parameter for inferencing.

28. The processing system of claim 27, wherein:

the at least one value of the distribution of input pre-activation values comprises a mean value and a variance value for the distribution, and the at least one trainable parameter comprises a first trainable parameter associated with the mean value and a second trainable parameter associated with the variance value.

29. A method for generating an inference using a neural network model, comprising:

receiving input data at a neuron of the neural network model, wherein the neuron is associated with a parameterized activation function defined based on a trainable parameter that adjusts at least one of a range over which the parameterized activation function is nonlinear or a shape of the parameterized activation function, wherein the parameterized activation function comprises:

a first monotonic function region for input values of the input data smaller than a first pivot value, and a second monotonic function region for input values of the input data greater than a second pivot value, wherein the first and second monotonic function regions have a same monotonicity;

processing the input data using the parameterized activation function to generate an output activation;

generating an inference using the neural network model based at least in part on the output activation; and outputting the inference from the neural network model.

\* \* \* \* \*